(12) United States Patent
Du

(10) Patent No.: US 9,836,857 B2
(45) Date of Patent: Dec. 5, 2017

(54) SYSTEM, DEVICE, AND METHOD FOR INFORMATION EXCHANGE

(71) Applicant: BEIJING ZHIGU RUI TUO TECH CO., LTD, Beijing (CN)

(72) Inventor: Lin Du, Beijing (CN)

(73) Assignee: BEIJING ZHIGU RUI TUO TECH CO., LTD., Beijing (CN)

(*) Notice: Subject to any disclaimer, the term of this patent is extended or adjusted under 35 U.S.C. 154(b) by 23 days.

(21) Appl. No.: 14/906,016

(22) PCT Filed: Jul. 2, 2014

(86) PCT No.: PCT/CN2014/081506
§ 371 (c)(1),
(2) Date: Jan. 19, 2016

(87) PCT Pub. No.: WO2015/090038
PCT Pub. Date: Jun. 25, 2015

(65) Prior Publication Data
US 2016/0163069 A1 Jun. 9, 2016

(30) Foreign Application Priority Data
Dec. 17, 2013 (CN) .......................... 2013 1 0695579
Dec. 17, 2013 (CN) .......................... 2013 1 0695747

(51) Int. Cl.
G06K 9/00 (2006.01)
G06T 9/00 (2006.01)
(Continued)

(52) U.S. Cl.
CPC ............ G06T 9/00 (2013.01); G02B 27/0172 (2013.01); G06K 9/0061 (2013.01);
(Continued)

(58) Field of Classification Search
CPC .. G06T 9/00; G06T 11/60; H04N 9/31; H04N 1/44; H04N 1/448; G06K 9/0061;
(Continued)

(56) References Cited

U.S. PATENT DOCUMENTS 6,529,209 B1 * 3/2003 Dunn ...................... G06F 21/84
345/629
7,289,668 B2 10/2007 Greene et al.
(Continued)

FOREIGN PATENT DOCUMENTS

CN 1829609 A 9/2006
CN 101510011 A 8/2009
(Continued)

OTHER PUBLICATIONS

Office Action for Chinese Application No. 201310695579.3, dated Jan. 26, 2016, (with English Translation), 22 pages.
(Continued)

*Primary Examiner* — Li Liu

(57) ABSTRACT

The application discloses an information exchange method and an information exchange system, the method including: overlaying at least one decoding template onto an encoded pattern in at least one eye fundus of a user, to obtain a recovery pattern presented in the at least one eye fundus of the user, where the recovery pattern corresponds to an original pattern of the encoded pattern, and the at least one decoding template corresponds to at least one encoder used when the encoded pattern is obtained. According to the technical solutions of the embodiments of this application, an encoded pattern is decoded by overlaying a decoding template to an encoded pattern in at least one eye fundus of a user, so that a specific user can conveniently and intuitively see information hidden in the encoded pattern directly on the spot.

23 Claims, 10 Drawing Sheets

(51) Int. Cl.
- *G06K 9/20* (2006.01)
- *G02B 27/01* (2006.01)
- *G06T 11/60* (2006.01)
- *H04N 9/31* (2006.01)
- *H04N 1/41* (2006.01)

(52) U.S. Cl.
CPC ......... *G06K 9/00604* (2013.01); *G06K 9/209* (2013.01); *G06T 11/60* (2013.01); *H04N 1/41* (2013.01); *H04N 9/31* (2013.01); *G02B 2027/014* (2013.01); *G02B 2027/0141* (2013.01); *G02B 2027/0178* (2013.01)

(58) Field of Classification Search
CPC ......... G06K 9/00604; G06K 19/06037; G02B 27/0172; G02B 2027/0178; G02B 2027/014; G02B 2027/0141; G09C 5/00; G06F 21/84; G09G 2340/10; G09G 2358/00

See application file for complete search history.

(56) References Cited

U.S. PATENT DOCUMENTS

| | | | |
|---|---|---|---|
| 9,418,215 B2* | 8/2016 | Kotla | G06F 21/36 |
| 2002/0101988 A1* | 8/2002 | Jones | G09C 5/00 380/54 |
| 2003/0108198 A1* | 6/2003 | Lahiri | G06F 21/84 380/54 |
| 2004/0028280 A1 | 2/2004 | Greene et al. | |
| 2005/0140572 A1* | 6/2005 | Kahan | G09C 5/00 345/7 |
| 2006/0008086 A1* | 1/2006 | Kevenaar | G09C 5/00 380/43 |
| 2006/0115082 A1* | 6/2006 | Kevenaar | G07D 7/0033 380/216 |
| 2006/0177060 A1* | 8/2006 | Johnson | G09C 5/00 380/255 |
| 2006/0179407 A1* | 8/2006 | Tuyls | G09C 5/00 715/700 |
| 2007/0057886 A1* | 3/2007 | Johnson | G09C 5/00 345/90 |
| 2010/0271396 A1* | 10/2010 | Nemeth | G06F 21/84 345/641 |
| 2013/0163818 A1* | 6/2013 | Rosset | G07D 7/128 382/103 |
| 2015/0302421 A1* | 10/2015 | Caton | G06Q 30/018 705/17 |

FOREIGN PATENT DOCUMENTS

| | | |
|---|---|---|
| CN | 101510012 A | 8/2009 |
| CN | 101510013 A | 8/2009 |
| CN | 101755462 A | 6/2010 |
| CN | 102795008 A | 11/2012 |
| CN | 102831567 A | 12/2012 |
| CN | 103424891 A | 12/2013 |
| CN | 103729824 A | 4/2014 |
| CN | 103745434 A | 4/2014 |
| WO | 2012/118912 A2 | 9/2012 |

OTHER PUBLICATIONS

Office Action for Chinese Application No. 201310695747.9, dated Apr. 18, 2016, (with English Translation), 16 pages.
Office Action for Chinese Application No. 201310695579.3, dated Jan. 26, 2017, (with English Translation), 14 pages.
PCT International Search Report and Written Opinion dated Sep. 30, 2014, issued in corresponding International Application No. PCT/CN2014/081506 (9 pages).

* cited by examiner

110

120

130

140

150

SYSTEM, DEVICE, AND METHOD FOR INFORMATION EXCHANGE

RELATED APPLICATIONS

Cross-Reference to Related Applications

This application is a national stage application of International Application No. PCT/CN2014/081506, filed on Jul. 2, 2014, which claims the benefit of priority to Chinese Patent Application No. 201310695579.3, entitled "INFORMATION EXCHANGE METHOD AND INFORMATION EXCHANGE SYSTEM", filed on Dec. 17, 2013, and the benefit of priority to Chinese Patent Application No. 201310695747.9, entitled "INFORMATION EXCHANGE METHOD AND INFORMATION EXCHANGE SYSTEM", filed on Dec. 17, 2013. The contents of the above-referenced applications are herein incorporated by reference in their respective entireties.

TECHNICAL FIELD

The present application relates to the field of information security, and, in particular, to information exchange in an information exchange system.

BACKGROUND

With the rapid development of information technologies, electronic information security has been paid more and more attention, and users need to keep their specific information a secret on many occasions. However, in some situations, carriers of the specific information may need to be disclosed to non-specific users; therefore, users often want to securely, conveniently and intuitively acquire specific information oriented to themselves from information carriers oriented to the non-specific users, but conventional systems are inadequate.

SUMMARY

The following presents a simplified summary in order to provide a basic understanding of some example embodiments disclosed herein. This summary is not an extensive overview. It is intended to neither identify key or critical elements nor delineate the scope of the example embodiments disclosed. Its sole purpose is to present some concepts in a simplified form as a prelude to the more detailed description that is presented later.

An example objective of the present application is to provide an information exchange technology.

To this or related ends, in a first example embodiment, the present application provides a method, including:

overlaying, by a system comprising a processor, at least one decoding template onto an encoded pattern in at least one eye fundus of a user, to obtain a recovery pattern presented in the at least one eye fundus of the user, where the recovery pattern corresponds to an original pattern of the encoded pattern, and the at least one decoding template corresponds to at least one encoder used when the encoded pattern is obtained.

In a second example embodiment, the present application provides a method, including:

overlaying, by a system comprising a processor, at least one encoding template with an original pattern, to obtain an encoded pattern.

In a third example embodiment, the present application provides a system, including:

a pattern recovery apparatus, configured to overlay at least one decoding template onto an encoded pattern in at least one eye fundus of a user, to obtain a recovery pattern presented in the at least one eye fundus of the user, where the recovery pattern corresponds to an original pattern of the encoded pattern, and the at least one decoding template corresponds to at least one encoder used when the encoded pattern is obtained.

In a fourth example embodiment, the present application provides a system, including:

a pattern encoding apparatus, configured to overlay at least one encoding template with an original pattern, to obtain the encoded pattern.

In a fifth example embodiment, the present application provides a wearable device, including the information exchange system.

In a sixth example embodiment, the present application provides a computer readable storage apparatus, including at least one executable instruction, which, in response to execution, causes a system comprising a processor to perform operations, comprising:

overlaying at least one decoding template onto an encoded pattern in at least one eye fundus of a user, to obtain a recovery pattern presented in the at least one eye fundus of the user, where the recovery pattern corresponds to at least one original pattern of the encoded pattern, and the at least one decoding template corresponds to at least one encoder forming the encoded pattern.

In a seventh example embodiment, the present application provides an information exchange system, comprising a processing device and a memory, wherein the memory stores at least one executable instruction, the processing device is communicatively coupled to the memory, and when the information exchange system operates, the processing device executes the at least one executable instruction stored by the memory, to cause the information exchange system to perform at least one operation, comprising:

overlaying at least one decoding template onto an encoded pattern in at least one eye fundus of a user, to obtain a recovery pattern presented in the at least one eye fundus of the user, where the recovery pattern corresponds to at least one original pattern of the encoded pattern, and the at least one decoding template corresponds to at least one encoder forming the encoded pattern.

In an eighth example embodiment, the present application provides a computer readable storage apparatus, including an executable instruction, where corresponding to execution of the executable instruction, an apparatus including a processor performs an operation, comprising:

overlaying at least one encoding template with at least one original pattern, to obtain an encoded pattern.

In a ninth example embodiment, the present application provides an information providing system, comprising a processing device and a memory, wherein the memory stores at least one executable instruction, the processing device is connected to the memory by means of a communications bus, and when the information providing system operates, the processing device executes the at least one executable instruction stored by the memory, to cause the information providing system to perform operations, comprising:

overlaying at least one encoding template with at least one original pattern, to obtain an encoded pattern.

According to at least one implementation solution of the technical solutions according to embodiments of the present application, a decoding template is overlaid to an encoded pattern in at least one eye fundus of a user to decode the encoded pattern, so that specific users can securely, conveniently and intuitively see information hidden in the encoded pattern directly on the spot.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

Methods and apparatuses of the present application are described in detail as follows with reference to the accompanying drawings and embodiments.

Figure 1:
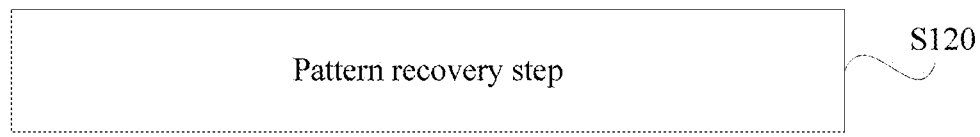
FIG. 1 is an example flowchart of steps of an information exchange method according to an embodiment of the present application.

In order to enable users to directly see corresponding hidden information when seeing a pattern including the hidden information, instead of obtaining the hidden information and presenting the hidden information to the users after analyzing an acquired pattern locally or sending the acquired pattern to a remote end for analysis. As shown in FIG. 1, an embodiment of the present application provides an information exchange method, including: S120, a pattern recovery step of overlaying at least one decoding template onto an encoded pattern in at least one eye fundus of a user, to obtain a recovery pattern presented in the at least one eye fundus of the user, where the recovery pattern corresponds to at least one original pattern of the encoded pattern, and the at least one decoding template corresponds to at least one encoder used when the encoded pattern is obtained.

The embodiment of the present application overlays a decoding template onto an encoded pattern in at least one eye fundus of a user when the user sees the encoded pattern, so that the user can directly see information included in the original pattern, and as the encoded pattern is directly formed in the at least one eye fundus of the user and cannot be seen by others, implementation thereof is secure, intuitive and convenient.

The step in the embodiment of the present application is further described below.

In one possible implementation manner of the embodiment of the present application, the at least one original pattern is one original pattern.

In the implementation manner of the present application, one or more encoders may encode the original pattern to obtain the encoded pattern, which is then decoded by means of one or more decoding templates. The following embodiment of the present application is described by encoding an original pattern by using one encoder to obtain an encoded pattern and overlaying one corresponding decoding template with the encoded pattern.

In step S120, the encoded pattern is decoded in a manner of overlaying the decoding template with the encoded pattern, so that the user may directly obtain, by viewing an overlaid recovery pattern, information included in the original pattern. In some implementation manners, the recovery pattern can completely express the information included in the original pattern, but is not completely identical with the original pattern. In one possible implementation manner, the recovery pattern is basically identical with the original pattern.

Definitely, in some implementation manners, when the recovery pattern is not completely identical with the original pattern, in order to make the user get better experience, the recovery pattern may be enhanced, so that the user sees an enhanced recovery pattern having higher similarity with the original pattern or better user visual experience.

Therefore, in one possible implementation manner of the embodiment of the present application, the method further includes:

a pattern enhancement step of obtaining at least one enhancement template according to the recovery pattern, and overlaying the at least one enhancement template to the recovery pattern, to obtain an enhanced recovery pattern presented in the at least one eye fundus of the user.

Figure 3A:
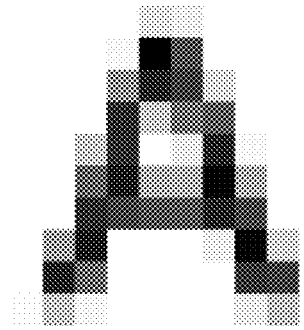
FIG. 3a to FIG. 3e are example schematic diagrams of an original pattern after being encoded and decoded in an information exchange method according to an embodiment of the present application.
Figure 3B:
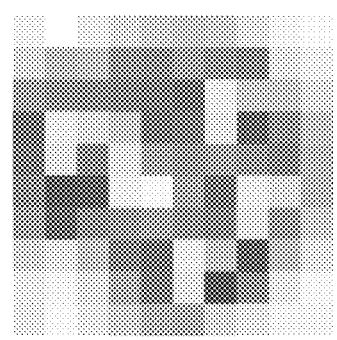
Figure 3C:
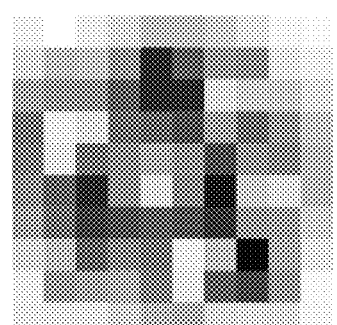
Figure 3D:
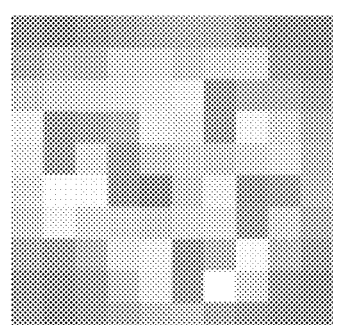
Figure 3E:
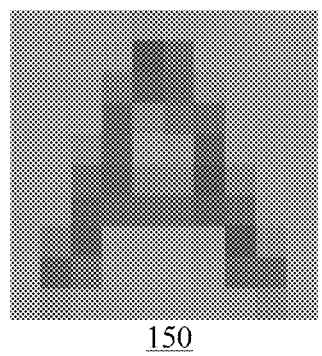

For example, it may be analyzed from a recovery pattern 150 obtained in FIG. 3e that, information to be presented to the user is "A", and therefore, an enhancement template may be obtained according to the recovery pattern 150, so that a pixel corresponding to the information "A" is blackened after the enhancement template is superimposed on the recovery pattern, and pixels corresponding to the background portion except "A" are highlighted, so the user may see a clear "A", thereby improving visual experience of the user.

In one implementation manner, the size of the decoding template is identical with that of the encoded pattern, step S120 is further setting the decoding template to coincide with the encoded pattern, so that pixel units in regions corresponding to the decoding template and the encoded pattern are overlapped and blended, so as to obtain the recovery pattern. In another embodiment, the decoding template may not completely coincide with the encoded pattern, for example, when the decoding template includes a stripe, the hidden information may be seen as long as the position of the stripe makes the stripe produce an interference effect with the encoded pattern.

Figure 2:
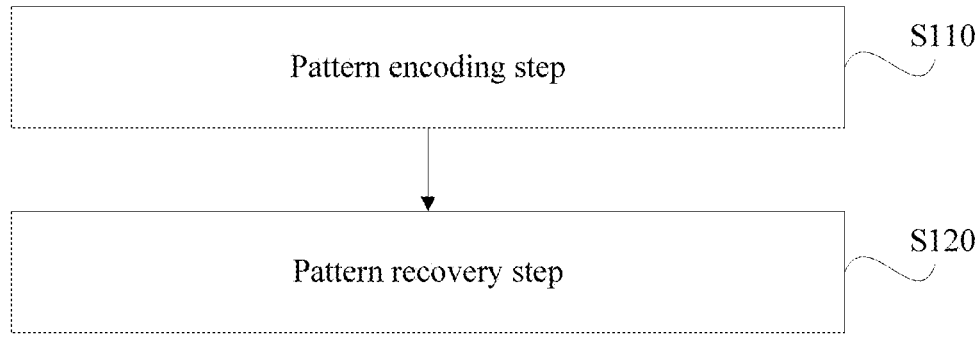
FIG. 2 is an example flowchart of steps of another information exchange method according to an embodiment of the present application.

As shown in FIG. 2, in the embodiment of the present invention, before the pattern recovery step, the information exchange method further includes:

S110, a pattern encoding step of encoding the original pattern by using an encoder, to obtain the encoded pattern.

In the embodiment of the present invention, the encoder includes at least one encoding template;

in the pattern encoding step, one encoding template is overlaid with the original pattern to obtain the encoded pattern.

In one implementation manner, the size of the encoding template is identical with that of the original pattern needing to hide information. In one implementation manner, the encoding template and the original pattern are blended and overlapped pixel by pixel, that is, each pixel on the encoding template overlays a corresponding pixel on the original pattern to obtain a corresponding overlaid pixel, and the overlaid pixels constitute the encoded pattern. Definitely, persons skilled in the art may know that, it is likely that the original pattern is embedded into a larger pattern or is part of the larger pattern, and at this time, only the original pattern in the larger pattern may be encoded, while patterns in other parts of the larger pattern remain unchanged.

Definitely, in other embodiments of the present application, it is likely that the encoder encodes the original pattern by using an encoding algorithm, to obtain the encoded pattern. For example, each pixel of the original pattern is encoded by using an encoding sequence.

In one possible implementation manner of the embodiment of the present application, the encoding template is an encoding pattern. The pattern is composed of one or more channels (R, G, B, A (red, green, blue, alpha) channels in an RGBA color space; or C, M, Y, K (cyan, magenta, yellow, black) channels in a CYMK color space) in a color space.

In the embodiment of the present application, the decoding template is a decoding pattern. The decoding pattern is composed of one or more channels in a color space.

In the embodiment of the present application, the encoding template and the decoding template may be obtained in the following two manners:

1) firstly obtain the encoding template, and then generate a corresponding decoding template according to the encoding template;

2) firstly obtain the decoding template, and then generate the encoding template according to the decoding template.

The two manners are described below in further detail respectively.

In one possible implementation manner, the encoding template is generated from a first pseudo-random sequence, to more effectively hide information in the original pattern.

In this case, the method generally further includes:

a decoding template generation step of generating the decoding template according to the encoding template.

In this implementation manner, for example, the decoding template may be generated at an information providing end and then be sent to a specific user-end device, so that the specific user-end device may use the decoding template to decode the encoded pattern, to obtain the information included in the original pattern. Definitely, in another possible implementation manner, the information providing end may provide the encoder or encoding template for the user-end device, and the user-end device generates the decoding template according to the encoding template.

In one possible implementation manner, the decoding template generation step includes converting the encoding template to obtain the decoding template. The converting herein may be reversal processing or reversal processing with compensation, and a specific conversion method is specifically given below, which is not repeated herein.

In another possible implementation manner, the decoding template may also be generated from a second pseudo-random sequence.

In this case, the method further includes:

an encoding template generation step of generating the encoding template according to the decoding template.

The decoding template may be generated at an information providing end, or may be generated at a user end.

In this implementation manner, for example, the encoding template may be obtained by converting the decoding template. The converting may be reversal processing or reversal processing with compensation. The step of obtaining an encoding template from the decoding template is similar to the foregoing step of obtaining the decoding template by means of the encoding template, which is not repeated herein.

In some implementation manners, the encoded pattern may be identified according to image characteristics of the encoded pattern. In other possible implementation manners, in order that the encoded pattern can be quickly identified and determined in the subsequent corresponding decoding process, after the pattern encoding step, the method may further include:

a positioning identifier setting step of setting at least one positioning identifier marking a region where the encoded pattern is located.

When it is necessary to decode the encoded pattern, once the positioning identifier is detected, the encoded pattern can be quickly determined, and the decoding template is overlaid onto the encoded pattern in the at least one eye fundus of the user.

In one possible implementation manner, the positioning identifier is a calibration pattern set around the encoded pattern. For example, the encoded pattern is a rectangular region, and the positioning identifier is a specific pattern located at three or four vertices of the rectangular region. After the user sees the encoded pattern, the method of the present application can quickly determine a region where the encoded pattern is located through the positioning identifier.

In the embodiment of the present application, there may be many methods of overlaying the decoding template to the encoded pattern in the at least one eye fundus of the user, for example:

in one possible implementation manner, the decoding template is directly projected to the at least one eye fundus of the user, so that the decoding template is overlaid with the encoded pattern in the at least one eye fundus of the user, and the user sees an overlaid recovery pattern in the position of the encoded pattern.

In this implementation manner, the decoding template and the encoded pattern in the at least one eye fundus of the user are directly overlaid in the at least one eye fundus of the user, without an intermediate medium, and therefore, only the user can acquire information of the corresponding original pattern, but others cannot see it, thereby guaranteeing information security of the user.

Alternatively, in another possible implementation manner, the decoding template may be inserted between eyes of the user and the encoded pattern, so as to overlay the decoding template with the encoded pattern in the at least one eye fundus of the user. For example, when the user wears a pair of smart glasses and lenses of the smart glasses are between eyes of the user and a viewed object, the function may be implemented by displaying the decoding template on the lenses.

When a device such as smart glasses is used to display the decoding template in a position close to the eyes, it is difficult for other users to see a decoded recovery pattern; therefore, this implementation manner may also effectively guarantee information security of the user.

Definitely, in one possible implementation manner, it is likely to project one decoding template to the at least one eye fundus of the user and also to insert another decoding template on an optical path between eyes of the user and the decoded pattern, and the decoded pattern is decoded in two manners.

Therefore, in one possible implementation manner of the embodiment of the present application, the pattern recovery step S120 includes:

an information projection step of projecting the decoding template to the at least one eye fundus of the user.

In another possible implementation manner, the pattern recovery step S120 includes:

an information display step of displaying the decoding template on the optical path between eyes of the user and the encoded pattern.

Alternatively, in another possible implementation manner, when a plurality of decoding templates are included, the pattern recovery step S120 includes:

projecting at least one decoding template in the plurality of decoding templates to the at least one eye fundus of the user; and displaying other decoding templates in the plurality of decoding templates on an optical path between eyes of the user and the encoded pattern.

In the implementation manner of the present application, the method of overlaying the at least one enhancement template to the recovery pattern is similar to that of overlaying the decoding template to the encoded pattern, which is not repeated herein.

In the implementation manner of the embodiment of the present application, the manner of directly presenting the decoding template to the at least one eye fundus of the user by projection mainly performs decoding by superimposition between the decoding template and the encoded pattern; and the manner of presenting the decoding template by display may cover a corresponding region of the encoded pattern by means of a corresponding region on the decoding template; therefore, it is necessary to select a corresponding encoding template and a decoding template for the two manners of presenting the decoding template. Implementation manners (the following implementation manner uses an RGBA color space as an example) of decoding and encoding manners respectively corresponding to the two manners are given below.

1) When the decoding template is presented in a manner of information projection:

suppose that eyes see an image A and there is another image B projected to the at least one eye fundus, an image C that the brain actually obtains is a superimposed image of the image B and the image A. A superimposition formula is as follows:

$$f(C)=f(B)+f(A) \quad (1)$$

where f(x) is an RGB component primary color value of a pixel x in an image (this implementation manner uses an RGBA color space as an example, but is not limited thereto), and a value thereof ranges from 0 to 1, where 0 corresponds to all black, and 1 corresponds to a solid color of each color component. f(C)=f(B)+f(A) indicates that an RGB component primary color value of each pixel in an image C is a sum of RGB component primary color values of corresponding pixels in an image B and an image A.

In the embodiment of the present application, the process of encoding an original pattern S with the above formula is as follows:

$$f(C)=f(P)+f(S) \quad (2)$$

where P is an encoding pattern, and C is an encoded pattern.

The process of decoding the encoded pattern may be similarly expressed as:

$$f(C')=f(P')+f(C) \quad (3)$$

where P' is a decoding pattern, and C' is a recovery pattern (that is, the decoded pattern). In this way, it may be deduced that an expression of C' is:

$$f(C')=f(P')+f(P)+f(S) \quad (4)$$

as long as the encoding pattern P and the decoding pattern P' can be reasonably constructed so that $$f(P')+f(P)=c \quad (5)$$

is established, the user can directly see the original pattern S whose dynamic range is narrowed to [0, 1−c] (the original pattern S whose dynamic range is narrowed is the recovery pattern C'), where c is a constant between 0 to 1, generally between 0 and 0.5.

If the encoding pattern P is established through a pseudo-random process (for example, obtained through a pseudo-random sequence), the encoded pattern C can be decoded in the manner of the embodiment of the present application as long as the decoding pattern P' is constructed through the following formula:

$$f(P')=c-f(P) \quad (6)$$

that is, when a sum of primary color values of color components of a pixel on the decoding pattern P' and a corresponding pixel on the encoding pattern P is a constant, the encoded pattern C can be decoded in the manner of the embodiment of the present application.

Definitely, persons skilled in the art may know that, when the decoding pattern P' is established through a pseudo-random process, the encoding pattern P may also be obtained correspondingly.

2) When the decoding template is presented in a manner of inserting the decoding template in an optical path between eyes and a recovery pattern:

a currently common transparent image overlaying algorithm is adopted, i.e., an Alpha Blending algorithm:

suppose that there is an image A and another transparent image B, an image C obtained is a blended image of the image B and the image A when the image A is seen through the image B. It is set that transparency of the image B is a (the value of a is between 0 to 1, where 1 corresponds to completely transparent, and 0 corresponds to completely opaque). A formula of the Alpha Blending algorithm is expressed as follows:

$$f(C)=(1-a)*f(B)+a*f(A) \quad (7)$$

where f(x) is an RGB component primary color value of a pixel x in an image, and a value thereof ranges from 0 to 1, where 0 corresponds to all black, and 1 corresponds to a solid color of each color component; a is transparency of each pixel in the image B.

Therefore, in the embodiment of the present application, the process of encoding an original pattern S may be expressed as follows with a formula:

$$f(C)=(1-a)*f(P)+a*f(S) \quad (8)$$

where P is an encoding pattern, C is an encoded pattern, and a is transparency of each pixel in the encoding pattern P.

A decoding process corresponding to the above encoding process may be similarly expressed as:

$$f(C')=(1-a')*f(P')+a'*f(C) \quad (9)$$

where P' is a decoded pattern, C' is a recovery pattern, and a' is transparency of each pixel in the decoded pattern P'. In this way, it may be deduced that an expression of the recovery pattern C' is:

$$f(C')=(1-a')*f(P')+a'*(1-a)*f(P)+a'*a*f(S) \quad (10)$$

if a*a' can keep constant for each pixel, as long as P and P' can be reasonably constructed so that $$(1-a')*f(P')+a'*(1-a)*f(P)=d \quad (11)$$

is established, the user can directly see the original pattern S whose dynamic range is narrowed to [0, a*a'−d], where d, a and a' are constants, and values of d, a and a' are between 0 to 1, generally between 0.5 and 1.

In this embodiment, suppose that the encoding pattern P is established through a pseudo-random process (for example, obtained through a pseudo-random sequence), the encoded pattern C can be decoded in the manner of the embodiment of the present application as long as the decoding pattern P' is constructed through the following formula:

$$f(P')=[d-a'*(1-a)*f(P)]/(1-a') \quad (12)$$

as RGBA values all range from 0 to 1, encoding and decoding processes of the two methods need to appropriately restrict or compress the range of primary color values of color components of pixels in the original pattern and the encoding and decoding patterns, so as to avoid or reduce a distortion problem caused when the values are out of bounds, and the prior art already has a solution to the problem, which is not repeated herein.

It can be seen from the above that, in the embodiment of the present application, as long as one of the decoding template and the encoding template is known, the other one can be correspondingly obtained according to the above formula. Definitely, in addition to the methods described above, the embodiment of the present application may also acquire the corresponding decoding or encoding template by using other suitable algorithms.

In one possible implementation manner, a pattern in a certain region may be identified as the encoded pattern by using image characteristics of the encoded pattern or the like, for example, image characteristics in a certain specific region are determined to be identical with or similar to those of the encoded pattern in an image analysis method. In some embodiments, as stated above, after the positioning identifier is set around the encoded pattern, a certain region can be more quickly and accurately determined as the encoded pattern by identifying the positioning identifier. Therefore, in one possible implementation manner, before the pattern recovery step, the method further includes:

a positioning identifier identification step of identifying the positioning identifier; and the pattern recovery step includes determining the encoded pattern according to the identified positioning identifier.

In the embodiment of the present application, an image in the at least one eye fundus of the user or an image of an object in the view of the user may be obtained in an image acquisition manner, and then the image is analyzed in an image processing (including the identification of the encoded pattern or identification of the positioning identifier) manner, to obtain the position of the encoded pattern on the image (obtaining a position of an object on an image through image acquisition and image processing may be solved according to existing structures and technologies in the prior art, which is not repeated herein), and the decoding template is projected according to the position of the encoded pattern on the image. However, in order to make a better effect of overlaying of the decoding template and the encoded pattern, in the system according to the embodiment of the present application, it is necessary to firstly determine the position of the encoded pattern relative to the user, and then present the decoding template according to the position of the encoded pattern relative to the user.

In the embodiment of the present application, the actual position of the encoded pattern can be determined by detecting a user sight fixation point relative to the position of the user.

There are many manners of detecting a user fixation point, for example, one or more of the following are included.

i) A pupil direction detector is used to detect an optical axis direction of one eye, and depth for the eye gazing a scenario is obtained through a depth sensor (for example, infrared distance measurement), to obtain a fixation point position of eye sight; the technology is an existing technology, which is not repeated in this implementation manner.

ii) Optical axis directions of two eyes are detected respectively, sight directions of the two eyes of the user are obtained according to the optical axis directions of the two eyes, and a fixation point position of eye sight is obtained according to an intersection point between the sight directions of the two eyes; the technology is an existing technology, which is not repeated herein.

iii) The fixation point position of eye sight is obtained according to an optical parameter of an optical path between an image acquisition position and eyes and an optical parameter of the eyes when an image whose definition presented on an eye imaging surface (that is, fundus) is in a set threshold range is acquired.

The step of detecting a current fixation point position of the user through the method iii) includes:

a fundus image acquisition step of acquiring an image in the at least one eye fundus of the user;

an adjustable imaging step of adjusting at least one imaging parameter of the optical path between the fundus image acquisition position and the eyes of the user until an image whose definition is in a set threshold range is acquired;

an image processing step of analyzing the acquired image in the fundus, to obtain the imaging parameter of the optical path between the fundus image acquisition position and the eyes corresponding to the image whose definition is in the set threshold range and at least one optical parameter of the eyes, and calculating the position of the current fixation point of the user relative to the user.

In the adjustable imaging step, adjustment may be performed according to a focal length of an optical device on the optical path between the eyes and the acquisition position and/or the position thereof in the optical path, and the image whose fundus definition is in the set threshold range may be obtained when the optical device is in a certain position or state.

In one possible implementation manner of the method according to the embodiment of the present application, the optical device may be a variable focal length lens, used for completing adjustment on its focal length by adjusting a refractive index and/or shape of the optical device; or may also be a lens group, used for completing adjustment on the focal length of the lens group by adjusting relative positions between lenses in the lens group. In the embodiment of the present application, the adjustment is automatic adjustment.

In addition, in the method according to the embodiment of the present application, the image processing step further includes:

analyzing the image acquired in the fundus image acquisition step, to find an image whose definition is in the set threshold range; and calculating an optical parameter of the eyes according to the image whose definition is in the set threshold range and a known imaging parameter when the image whose definition is in the set threshold range is obtained.

Herein, the optical parameter of the eyes includes an eye sight direction, and the sight direction may be determined according to the image in the fundus whose definition is in the set threshold range or an image otherwise shot in an eye pupil.

After a current optical parameter of the eyes is obtained, a distance from an eye-to-focus to the eyes is obtained through calculation (the specific calculation process will be detailed in combination with the apparatus) according to the imaging parameter of the optical path between the fundus image acquisition position and the eyes and the optical parameter of the eyes, thereby obtaining the position of the eye fixation point.

Definitely, persons skilled in the art may know that, except the several forms of the fixation point detection methods, other methods that can be used for detecting the fixation point of the eyes of the user may also be used in the method according to the embodiment of the present application.

In the present application, as the user is viewing the encoded pattern, the fixation point of the user is on the encoded pattern, and then the position of the encoded pattern relative to the user can be obtained according to characteristics of the encoded pattern (characteristics of the encoded pattern or characteristics of a positioning identifier around the encoded pattern). In order that the method according to the embodiment of the present application can quickly and accurately determine a position of the decoding template to be presented according to the position of the encoded pattern (including the position of the encoded pattern actually relative to the user or the position of the image of the encoded pattern formed in the at least one eye fundus of the user), in one possible implementation manner, the method may include:

a calibration step of establishing a corresponding relationship between a presentation parameter (including presentation position, size, angle and the like) of the decoding template and the position of the encoded pattern through calibration.

For example, a mapping table between the presentation parameter of the decoding template and the position of the encoded pattern is established, so that, in the following pattern recovery step, when the position of the encoded pattern is obtained, position, size and other parameters of the decoding template to be presented can be quickly and accurately obtained according to the mapping table, which does not require other calculation or calibration.

The method according to the embodiment of the present application is further described below with reference to FIG. 3a to FIG. 3e.

An original pattern 110 shown in FIG. 3a is encoded by using an encoding template 120 shown in FIG. 3b, and in the embodiment of the present application, the encoding is overlaying the encoding template 120 with the original pattern 110 pixel by pixel, to obtain an encoded pattern 130 shown in FIG. 3c.

When the user sees the encoded pattern 130, a decoding template 140 shown in FIG. 3d is overlaid onto the encoded pattern 130 in the at least one eye fundus of the user, so that the user sees a recovery pattern 150 shown in FIG. 3e.

In this implementation manner, the decoding template 140 is a decoding pattern generated from a second pseudo-random sequence. The encoding template 120 is obtained after reversal processing of the decoding template 140.

In another possible implementation manner of the embodiment of the present application, the encoded pattern corresponds to a plurality of original patterns, and in this case, step S110 includes:

encoding the plurality of original patterns by means of the multiple groups of encoders in a one-to-one corresponding manner, to obtain a plurality of initial encoded patterns, where each group of encoders in the multiple groups of encoders include at least one sub-encoder; and synthesizing the plurality of initial encoded patterns into the encoded pattern.

Herein, the at least one encoder is multiple groups of encoding templates whose mutual interference values are in a set range.

In one possible implementation manner, the multiple groups of encoders are multiple groups of encoding templates, where each group of encoding templates in the multiple groups of encoding templates include at least one sub-encoding template; and the encoding the plurality of original patterns by means of the multiple groups of encoders in a one-to-one corresponding manner, to obtain a plurality of initial encoded patterns includes:

overlaying the multiple groups of encoding templates to the plurality of original patterns in a one-to-one corresponding manner, to obtain the plurality of initial encoded patterns.

In step S110, for example, if it is necessary to encode two original patterns (which are generally different original patterns), it is necessary to use two groups of encoders to encode the two original patterns respectively, that is, encode a first original pattern by means of a first group of encoders to obtain a first initial encoded pattern; and then encode a second original pattern by means of a second group of encoders to obtain a second initial encoded pattern. One group of encoders may only have one sub-encoder, or may include a plurality of sub-encoders, the following embodiment of the present application uses that one group of encoders only have one sub-encoder as an example for description, and persons skilled in the art may know that, in the embodiment of the present application, one group of encoders may also include a plurality of sub-encoders.

In the embodiment of the present application, mutual interference values between multiple groups of encoders are in a set range, and the mutual interference values herein, for example, are dot product operation values between the multiple groups of encoders.

In this implementation manner, the manner of synthesizing the plurality of initial encoded patterns into an encoded pattern may be:

overlaying the plurality of initial encoded patterns into an encoded pattern; for example, color values of corresponding pixels of the plurality of initial encoded patterns are overlapped and blended according to a set rule; or extracting several pixels on each initial encoded pattern respectively, where positions of the pixels extracted on different initial encoded patterns do not coincide, and then the pixels extracted from different positions on the different initial encoded patterns are synthesized into an encoded pattern according to positions of original pixels. For example, in one implementation manner, the initial encoded pattern includes: a first initial encoded pattern and a second initial encoded pattern, where pixels in odd-numbered lines and even-numbered columns and in even-numbered lines and odd-numbered columns of the first initial encoded pattern are extracted, pixels in odd-numbered lines and odd-numbered columns and in even-numbered lines and even-numbered columns of the second initial encoded pattern are extracted, and then the pixels extracted from the first and second initial encoded patterns are correspondingly filled into the encoded pattern according to their respective positions in the first and second initial encoded patterns, to just make up an encoded pattern with the same size as that of the first and second initial encoded patterns.

Definitely, persons skilled in the art may know that, other suitable methods of synthesizing a plurality of patterns may also be applied to the embodiment of the present application.

In this case, step S120 includes:

overlaying at least one decoding template onto the encoded pattern in the at least one eye fundus of the user, to obtain a recovery pattern corresponding to one original pattern in the plurality of original patterns; where the at least one decoding template corresponds to at least one group of encoders in the multiple groups of encoders.

In the implementation manner of the embodiment of the present application, the manner of directly projecting the decoding template in the at least one eye fundus of the user mainly performs decoding by superimposition between the decoding template and the encoded pattern; and the manner of presenting the decoding template by display may cover a corresponding region of the encoded pattern by means of a corresponding region on the decoding template; therefore, it is necessary to select a corresponding encoding template and a decoding template for the two manners of presenting the decoding template. Implementation manners of decoding and encoding manners respectively corresponding to the two manners are given below. In this implementation manner, each group of encoding templates include a sub-encoding template, the sub-encoding template may be an encoding pattern, and the decoding template may be a decoding pattern.

1) When the decoding template is presented in a manner of information projection:

suppose that eyes see an image A and there is another image B projected to the at least one eye fundus, an image C that the brain actually obtains is a superimposed image of the image B and the image A. A superimposition formula is as follows:

$$f(C)=f(B)+f(A) \tag{21}$$

where f(x) is an RGB component primary color value of a pixel x in an image (the implementation manner uses an RGBA color space as an example, but is not limited thereto), and a value thereof ranges from 0 to 1, where 0 corresponds to all black, and 1 corresponds to a solid color of each color component. $f(C)=f(B)+f(A)$ indicates that an RGB component primary color value of each pixel in an image C is a sum of RGB component primary color values of corresponding pixels in an image B and an image A.

In the embodiment of the present application, the process of encoding an nth original pattern with the above formula is as follows:

$$f(Cn)=f(Pn)+f(Sn) \tag{22}$$

where Pn is an encoding pattern corresponding to the nth original pattern, Cn is an initial encoded pattern obtained after the nth original pattern is encoded, n is a natural number from 1 to N, and N is the total number of the original pattern.

In the embodiment of the present application, RGB component primary color values of pixels of the encoded pattern C may be obtained by means of the following formula:

$$f(C)=f(C1)+f(C2)+\ldots f(CN) \tag{23}$$

the process of deciding the initial encoded pattern may be similarly expressed as:

$$f(Cn')=f(Pn')+f(C) \tag{24}$$

where Pn' is a decoding pattern corresponding to the nth original pattern, and Cn' is a recovery pattern (that is, the decoded pattern) corresponding to the nth original pattern. In this way, it may be deduced that an expression of the recovery pattern Cn' corresponding to the nth original pattern is:

$$f(Cn')=f(Pn')+f(Pn)+f(Sn) \tag{25}$$

That there are two original patterns is used as an example, if the first initial encoded pattern C1 and the second initial encoded pattern C2 are overlaid into an encoded pattern C, $$f(C1') = \\ f(P1')+f(C1)+f(C2) = f(P1')+f(P1)+f(S1)+f(P2)+f(S2) \tag{26}$$

$$f(C2') = \\ f(P2')+f(C1)+f(C2) = f(P2')+f(P1)+f(S1)+f(P2)+f(S2) \tag{27}$$

In the formulae, when a first decoding template P1' and a second decoding template P2' satisfy an equation system consisting of a formula (28) and a formula (29), a first recovery pattern C1' and a second recovery pattern C2' whose dynamic ranges are narrowed compared with a first original pattern S1 and a second original pattern S2 can be obtained in the at least one eye fundus of the user:

$$f(P1')+f(P1)+f(P2)+f(S2)=c1 \tag{28}$$

$$f(P2')+f(P1)+f(S1)+f(P2)=c2 \tag{29}$$

if they are established, users respectively corresponding to a first decoding template and a second decoding template can respectively directly see the first original pattern S1 whose dynamic range is narrowed to [0, 1−c] (the original pattern S1 whose dynamic range is narrowed is the first recovery pattern C1') and the second original pattern S2 whose dynamic range is narrowed to [0, 1−c2], where c1 and c2 are constants between 0 to 1, generally between 0 and 0.5.

As the original pattern Sn is known, if the encoding pattern Pn is established through a pseudo-random process (for example, obtained through a pseudo-random sequence), the encoded pattern C can be decoded by using the decoding pattern Pn' as long as the decoding pattern Pn' is constructed by using the following formulae:

$$f(P1')=c1-[f(P1)+f(P2)+f(S2)] \quad (30)$$

$$f(P2')=c2-[f(P1)+f(S1)+f(P2)] \quad (31)$$

Definitely, persons skilled in the art may know that, when the decoding pattern Pn' is established through a pseudo-random process, the encoding pattern Pn may also be obtained correspondingly according to the formulae (28) and (29).

2) When the decoding template is presented in a manner of inserting the decoding template in an optical path between eyes and a recovery pattern:

a currently common transparent image overlaying algorithm is adopted, i.e., an Alpha Blending algorithm:

suppose that there is an image A and another transparent image B, an image C obtained is a blended image of the image B and the image A when the image A is seen through the image B. It is set that transparency of the image B is a (the value of a is between 0 to 1, where 1 corresponds to completely transparent, and 0 corresponds to completely opaque). A formula of the Alpha Blending algorithm is expressed as follows:

$$f(C)=(1-a)*f(B)+a*f(A) \quad (32)$$

where f(x) is an RGB component primary color value of a pixel x in an image, and a value thereof ranges from 0 to 1, where 0 corresponds to all black, and 1 corresponds to a solid color of each color component; a is transparency of each pixel in the image B.

Therefore, in the embodiment of the present application, the process of encoding an nth original pattern Sn may be expressed as follows with a formula:

$$f(Cn)=(1-an)*f(Pn)+an*f(Sn) \quad (33)$$

where Pn is an encoding pattern corresponding to the nth original pattern Sn, Cn is an initial encoded pattern corresponding to the nth original pattern Sn, and an is transparency of each pixel in the encoding pattern Pn.

An encoded pattern C synthesized from N initial encoded patterns Cn may be obtained from the following formula:

$$f(C)=f(C1)+f(C2)+\ldots f(CN) \quad (34)$$

A decoding process corresponding to the above encoding process may be similarly expressed as:

$$f(Cn')=(1-an')*f(Pn')+an'*f(C) \quad (35)$$

where Pn' is a decoding pattern corresponding to the nth original pattern Sn, Cn' is a recovery pattern corresponding to the nth original pattern Sn, and an' is transparency of each pixel in the decoding pattern Pn'. In this way, it may be deduced that an expression of the recovery pattern Cn' is:

$$f(Cn')=(1-an')*f(Pn')+an'*[f(C1)+f(C2)+\ldots f(CN)] \quad (36)$$

The process of encoding and decoding the first original pattern S1 and the second original pattern S2 is taken as an example.

$$\begin{aligned}f(C1') &= (1-a1')*f(P1')+a1'*[f(C1)+f(C2)] = \\ &\quad (1-a1')*f(P1')+a1'*(1-a1)*f(P1)+ \\ &\quad a1'*a1*f(S1)+a1'*(1-a2)*f(P2)+a1'*a2*f(S2)\end{aligned} \quad (37)$$

$$\begin{aligned}f(C2') &= (1-a2')*f(P2')+a2'*[f(C1)+f(C2)] = \\ &\quad (1-a2')*f(P2')+a2'*(1-a1)*f(P1)+ \\ &\quad a2'*a1*f(S1)+a2'*(1-a2)*f(P2)+a2'*a2*f(S2)\end{aligned} \quad (38)$$

as a1*a1' and a2*a2' can keep constant for each pixel, as long as the following two formulae (39) and (40) are satisfied, the two original patterns S1 and S2 can be overlaid and decoded by using decoding patterns P1' and P2' to obtain corresponding recovery patterns C1' and C2':

$$(1-a1')*f(P1')+a1'*(1-a1)*f(P1)+a1'*(1-a2)*f(P2)+a1*a2*f(S2)=d1 \quad (39)$$

$$(1-a2')*f(P2')+a2'*(1-a1)*f(P1)+a2'*(1-a2)*f(P2)+a2'*a1*f(S1)=d2 \quad (40)$$

As d1 and d2 are constants, the first original pattern S1 and the second original pattern S2 are known at an encoding end, encoding patterns P1 and P2 can be generated by pseudo-random sequences, and corresponding encoding patterns P1' and P2' can be obtained by solving the formulae (39) and (40).

It can be seen from the formulae (37) to (40) that, the recovery pattern Cn corresponding to the nth original pattern Sn is the nth original pattern Sn whose dynamic range is narrowed to [0, an*an'−dn], where the value of an*an'−dn is between 0 and 1, generally between 0.5 and 1.

It can be seen from the above that, in the case of multiple paths, a decoding pattern Pn' used by one user needs to be associated with original patterns of other users, but a certain degree of security still can be ensured as the encoded pattern C overlays information of multiple decoding patterns P1 to PN.

As RGBA values all range from 0 to 1, the encoding and decoding processes of the two methods need to appropriately restrict or compress the range of primary color values of color components of pixels in the original pattern and the encoding and decoding patterns, so as to avoid or reduce a distortion problem caused when the values are out of bounds, and the prior art already has a solution to the problem, which is not repeated herein.

In addition to the methods described above, the embodiment of the present application may also acquire the corresponding decoding or encoding template by using other suitable algorithms.

One application scenario of the embodiment of the present application is as follows:

an information providing end needs to provide two pieces of information separately included in a first original pattern and a second original pattern for a first user and a second user.

A first group of encoding templates are overlaid to the first original pattern to obtain a first initial encoded pattern, and a second group of encoding templates are overlaid to the second original pattern to obtain a second initial encoded pattern, where the first group of encoding templates and the second group of encoding templates are orthogonal to each other;

then, the first initial encoded pattern and the second initial encoded pattern are synthesized into an encoded pattern;

the first user has a first decoding template, the first decoding template is overlaid with the encoded pattern in at least one eye fundus of the user after the first user sees the encoded pattern, so that the first user sees a first recovery pattern corresponding to the first original pattern, so as to obtain information included in the first original pattern; the second user has a second decoding template, the second decoding template is overlaid with the encoded pattern in the at least one eye fundus of the user after the second user sees the encoded pattern, so that the second user sees a second recovery pattern corresponding to the second original pattern, so as to obtain information included in the second original pattern.

The first user and the second user may see the encoded pattern on the same presentation device (for example, a display screen), for example, view pictures displayed on the same common screen; therefore, the embodiment of the present application may transfer different corresponding information to different audiences by means of limited public resources. In addition, when the information providing end provides different information for different users, it is only necessary to provide the same information.

In this implementation manner, the process of overlaying and decoding the decoding template and the encoded pattern may be identical with the corresponding descriptions in the above implementation manner, which is not repeated herein.

In this implementation manner, different specific users can directly see information included in their corresponding original patterns from the same encoded pattern by means of their corresponding decoding templates, and in addition to that the user can securely, conveniently and intuitively obtain specific information, the effect of saving resources is also achieved.

In the above manner, the information providing end provides information for a specific user, the user can directly see the information by overlaying a visible decoding template and an encoded pattern, and the acquisition process thereof is quick, convenient, and secure.

Figure 4:
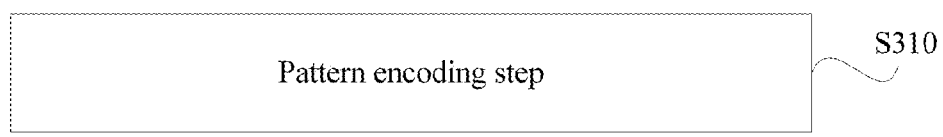
FIG. 4, FIG. 5a, and FIG. 5b are example flowcharts of steps of three information providing methods according to an embodiment of the present application.

As shown in FIG. 4, an embodiment of the present invention further provides an information providing method, including:

S310, a pattern encoding step of overlaying at least one encoding template with at least one original pattern, to obtain an encoded pattern.

Herein, one or more encoding templates may be overlaid with the at least one original pattern, and this implementation manner is further described below by using that one encoding template is overlaid with the original pattern to obtain the encoded pattern as an example.

In the embodiment of the present application, the encoding template is an encoding pattern (as shown in FIG. 3b).

In one implementation manner, the encoding template is generated from a first pseudo-random sequence.

Figure 5A:
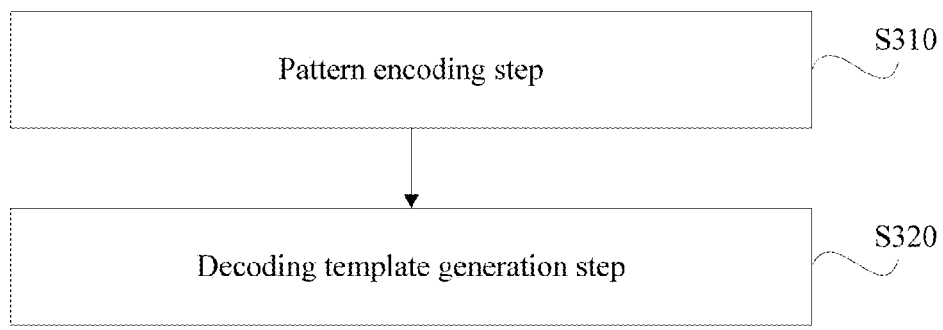

In this implementation manner, as shown in FIG. 5a, the method further includes:

S320, a decoding template generation step of generating a decoding template corresponding to the encoding template, and obtaining a recovery pattern corresponding to the original pattern after the decoding template and the encoded pattern are overlaid.

The decoding template is obtained by converting the encoding template. The converting is reversal processing or reversal processing with compensation.

Figure 5B:
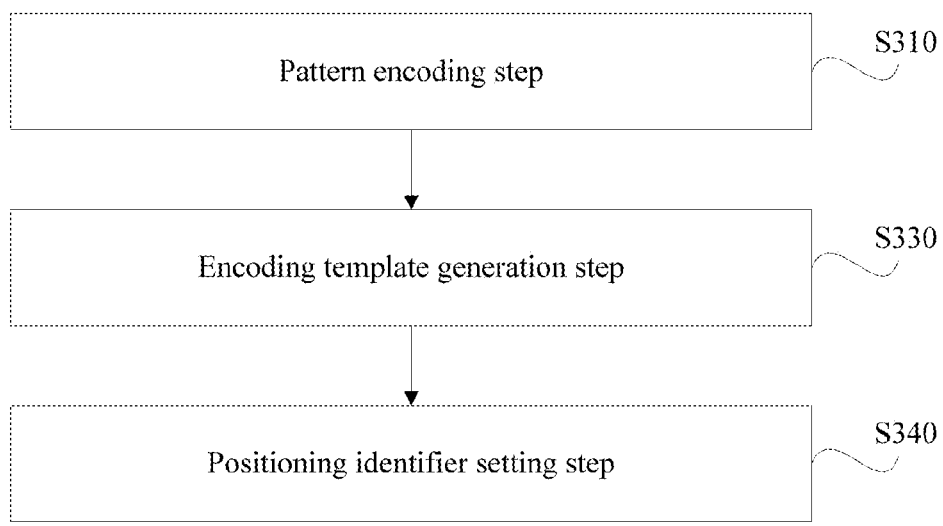

In another implementation manner, as shown in FIG. 5b, the method further includes:

S330, an encoding template generation step of generating the encoding template corresponding to a decoding template, and obtaining a recovery pattern corresponding to the original pattern after the decoding template and the encoded pattern are overlaid.

The encoding template is obtained by converting the decoding template. The converting is reversal processing or reversal processing with compensation.

As shown in FIG. 5b, in one possible implementation manner of the embodiment of the present application, the method further includes:

S340, a positioning identifier setting step of setting a positioning identifier marking a region where the encoded pattern is located.

Figure 5C:
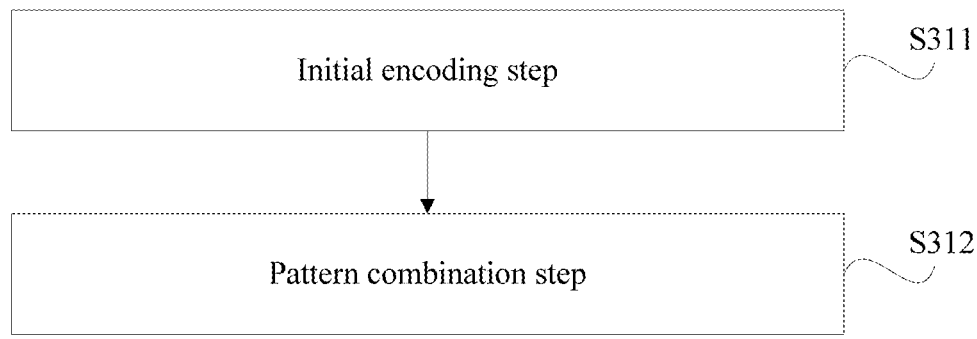
FIG. 5c is an example flowchart of a pattern encoding step according to an embodiment of the present application.

As shown in FIG. 5c, in another possible implementation manner of the embodiment of the present application, the encoded pattern corresponds to a plurality of original patterns, and the step S310 includes:

an initial encoding step S311 of overlaying multiple groups of encoding templates whose mutual interference values are in a set range to the plurality of original patterns in a one-to-one corresponding manner, to obtain a plurality of initial encoded patterns, where each group of encoding templates include at least one encoding template; and a pattern combination step S312 of synthesizing the plurality of initial encoded patterns into an encoded pattern.

The encoded pattern obtained by encoding according to the pattern encoding step of the implementation manner shown in FIG. 5c may include information included in the plurality of original patterns, so that information provided for multiple users may be transferred by means of the same carrier, which saves resources; in addition, information included in one original pattern therein may be obtained by overlaying of at least one decoding template corresponding to one group of encoding templates and the encoded pattern, which provides a basis for convenient and secure decoding of the user end.

For detailed implementation manners of the steps, refer to corresponding descriptions in the embodiment of the information exchange method, which are not repeated herein.

According to the encoded pattern obtained by encoding according to the pattern encoding step of the implementation manner, decoding of the encoded pattern can be completed by overlaying a decoding template corresponding to the encoding template and the encoded pattern, which provides a basis for convenient and secure decoding of the user end.

Persons skilled in the art may understand that, in the methods of DETAILED DESCRIPTION OF THE EMBODIMENTS of the present application, numbers of the steps do not mean the sequence of execution, the sequence of execution of the steps should be determined according to their functions and internal logic, but should not constitute any limitations to implementation of DETAILED DESCRIPTION OF THE EMBODIMENTS of the present application.

Figure 6:
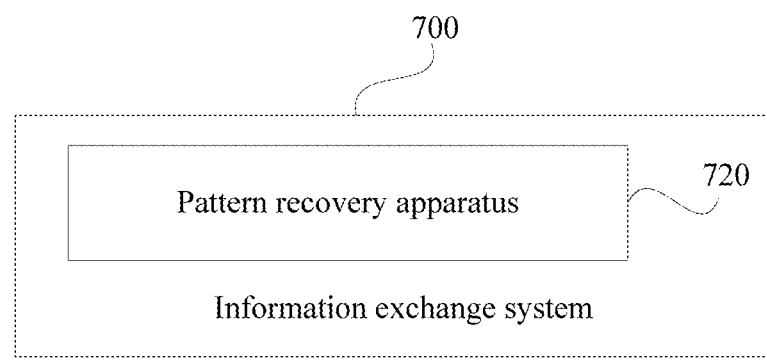
FIG. 6 is an example schematic structural block diagram of an information exchange system according to an embodiment of the present application.

As shown in FIG. 6, FIG. 6 is a schematic structural block diagram of an information exchange system 700 according to an embodiment of the present application, including: a pattern recovery apparatus 720, used for overlaying at least one decoding template onto an encoded pattern in at least one eye fundus of a user, to obtain a recovery pattern presented in the at least one eye fundus of the user, where the recovery pattern corresponds to an original pattern of the encoded pattern, and the at least one decoding template corresponds to at least one encoder used when the encoded pattern is obtained.

The system according to the embodiment of the present application overlays a decoding template onto an encoded pattern in at least one eye fundus of a user when the user sees the encoded pattern, so that the user can directly see information included in an original pattern, and implementation thereof is intuitive and convenient.

In another possible implementation manner of the embodiment of the present application, the encoded pattern corresponds to a plurality of original patterns, and in this implementation manner:

the pattern recovery apparatus 720 is further used for overlaying at least one decoding template onto the encoded pattern in the at least one eye fundus of the user to obtain a recovery pattern corresponding to one original pattern in the plurality of original patterns; where the at least one decoding template corresponds to one group of encoders encoding the original pattern in the plurality of original patterns.

The embodiment of the present application overlays a decoding template onto an encoded pattern in at least one eye fundus of a user when the user sees the encoded pattern, so that the user can directly see information included in an original pattern, and implementation thereof is intuitive and convenient; in addition, different specific users can directly see information included in their corresponding original patterns from the same encoded pattern by using their corresponding decoding templates, which achieves the effect of saving resources.

Figure 7:
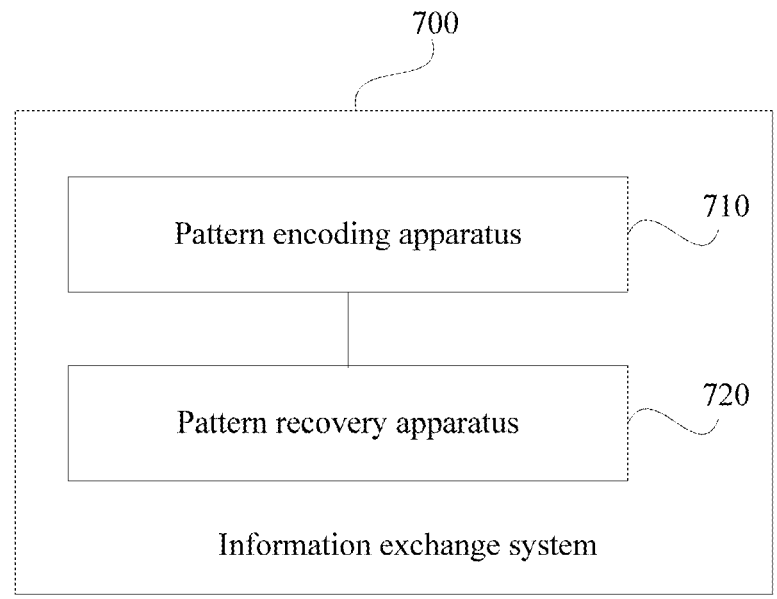
FIG. 7, FIG. 8a, and FIG. 8b are example schematic structural block diagrams of another three information exchange systems according to an embodiment of the present application.

FIG. 7 is a schematic structural block diagram of another information exchange system 700 according to an embodiment of the present application, and in this embodiment, in addition to the pattern recovery apparatus 720, the information exchange system 700 further includes:

a pattern encoding apparatus 710, used for encoding an original pattern by using the at least one encoder, to obtain the encoded pattern.

Generally, the pattern encoding apparatus 710 is located at an information providing end and hides information only required to be provided for specific users; the pattern recovery apparatus 720 is located at a user end and used for directly displaying the information correspondingly hidden in the encoded pattern to the users.

In the implementation manner of the present application, one or more encoders encode the original pattern to obtain an encoded pattern, and then decoding is performed by using one or more decoding templates. The following embodiment of the present application uses that one encoder encodes the original pattern to obtain an encoded pattern, and one corresponding template is overlaid with the encoded pattern as an example to describe the embodiment of the present application.

Apparatuses and modules of the system according to the embodiment of the present application are further described below.

In one possible implementation manner of the embodiment of the present application, the encoder includes at least one encoding template. In other implementation manners of the embodiment of the present application, the encoder may also encode the original pattern by using an encoding algorithm, to obtain the encoded pattern. For example, each pixel of the original pattern is encoded by using an encoding sequence.

This implementation manner is further described by using that the encoder is an encoding template as an example. In the embodiment of the present application, the pattern encoding apparatus 710 is further used for overlaying the encoding template with the original pattern to obtain the encoded pattern. For overlaying of the encoding template and the original pattern, refer to corresponding descriptions in the embodiment of the information exchange method specifically, which is not repeated herein.

In one possible implementation manner of the embodiment of the present application, the encoding template is an encoding pattern. The encoding pattern is composed of one or more of color channels in a color space.

Figure 8A:
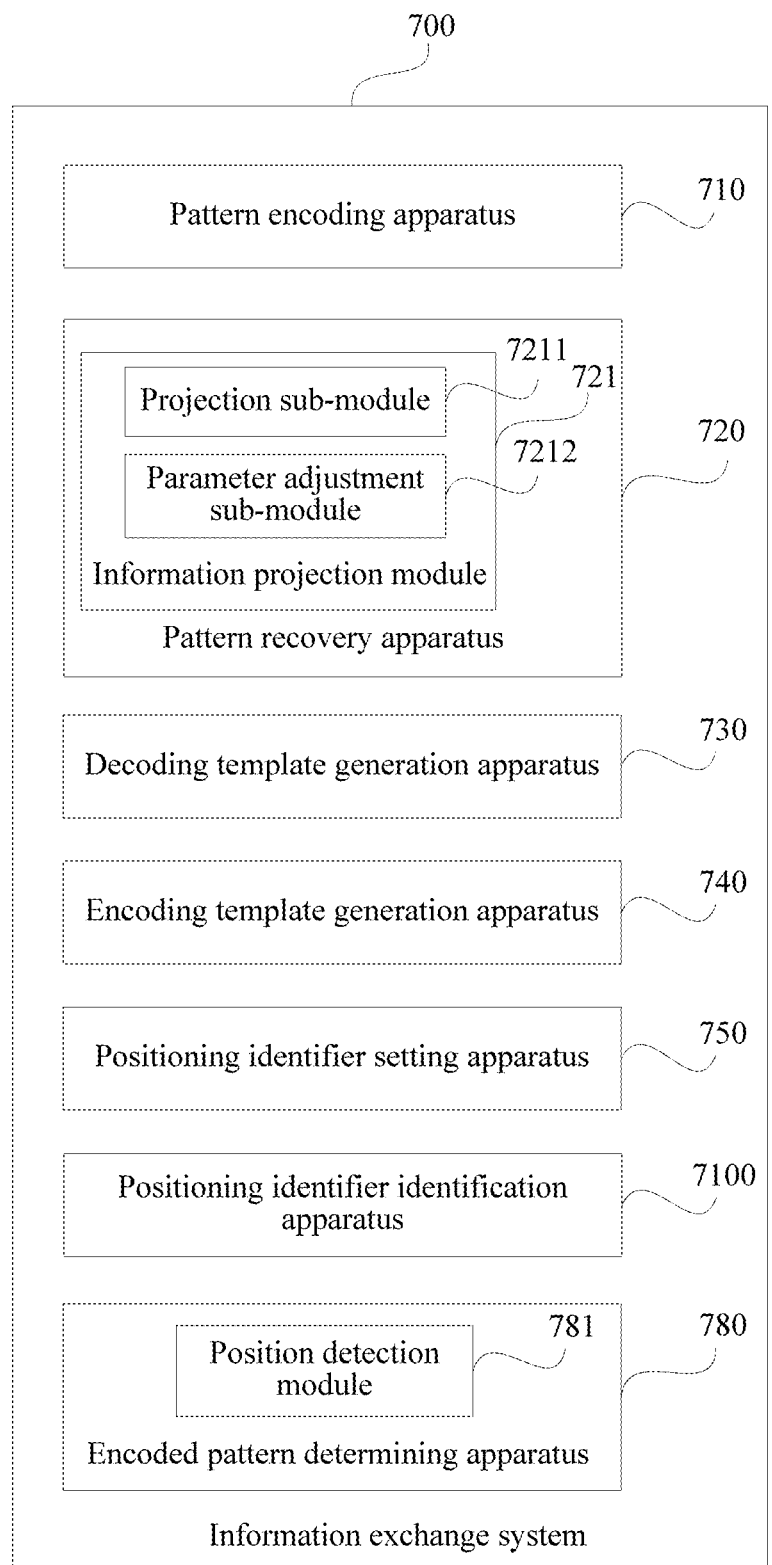
Figure 8B:
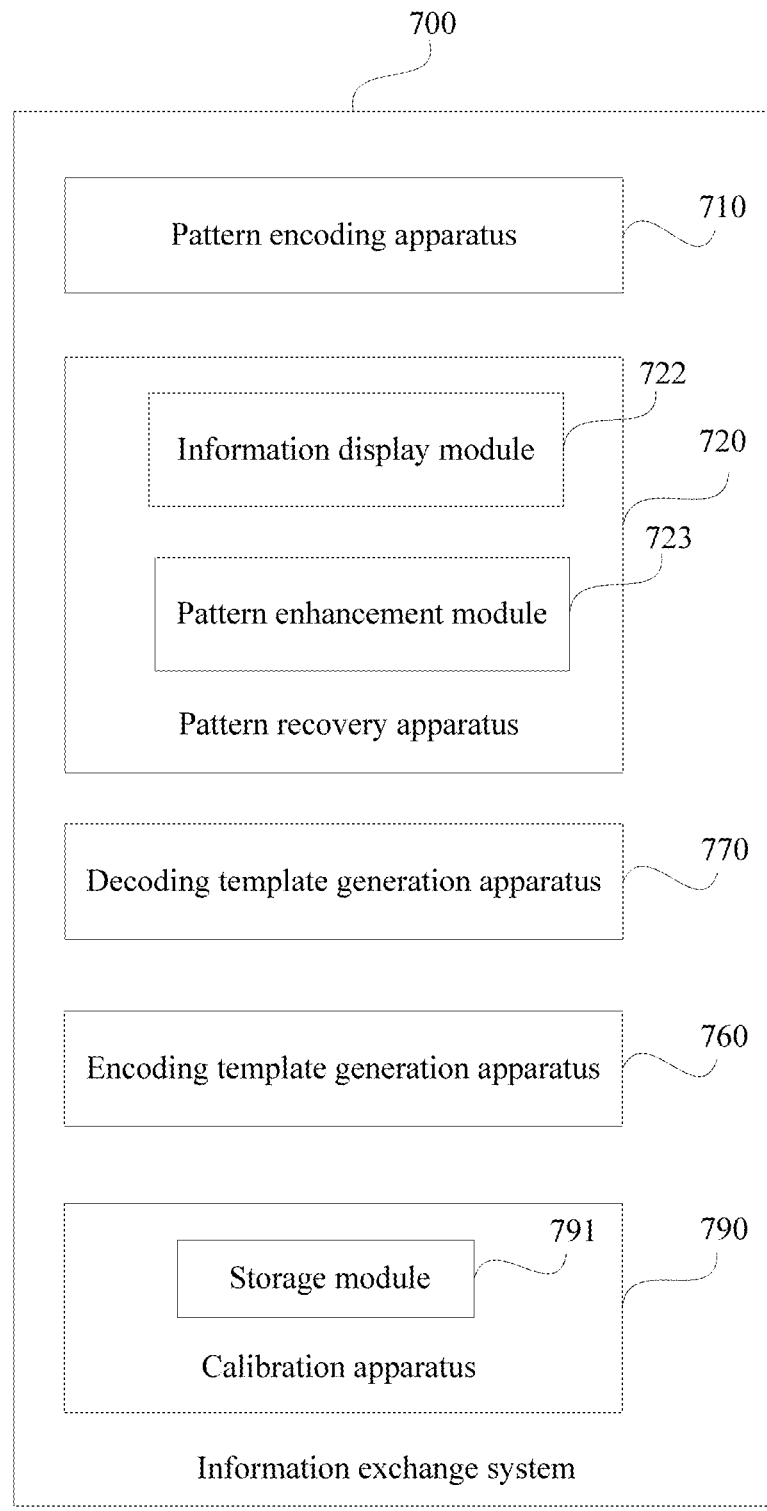
Figure 8C:
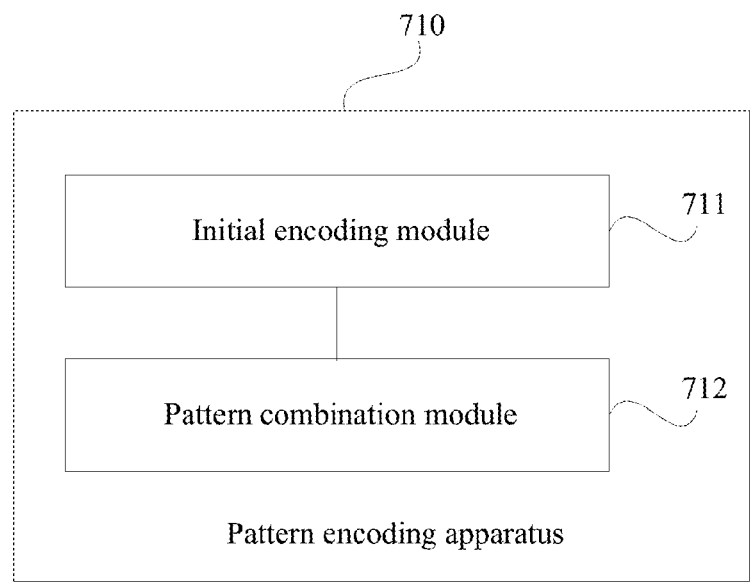
FIG. 8c is an example schematic structural block diagram of a pattern encoding apparatus according to an embodiment of the present application.

As shown in FIG. 8c, in another possible implementation manner of the embodiment of the present application, when the encoded pattern corresponds to a plurality of original patterns, the pattern encoding apparatus 710 includes:

an initial encoding module 711, used for encoding the plurality of original patterns by using the multiple groups of encoders in a one-to-one corresponding manner, to obtain a plurality of initial encoded patterns, where each group of encoders in the multiple groups of encoders include at least one sub-encoder; and a pattern combination module 712, used for synthesizing the plurality of initial encoded patterns into the encoded pattern.

In one possible implementation manner, the multiple groups of encoders are multiple groups of encoding templates, where each group of encoding templates in the multiple groups of encoding templates include at least one sub-encoding template; and the initial encoding module 711 is further used for overlaying the multiple groups of encoding templates to the plurality of original patterns in a one-to-one corresponding manner, to obtain the plurality of initial encoded patterns.

In this implementation manner, each group of encoding templates in the multiple groups of encoding templates are orthogonal to other groups of encoding templates in the multiple groups of encoding templates.

For the process of encoding the plurality of original patterns according to the pattern encoding apparatus 710 shown in FIG. 8c, refer to corresponding descriptions in the embodiment of the information exchange method, which is not repeated herein.

As shown in FIG. 8a, in one possible implementation manner, the system 700 obtains a decoding template corresponding to a specific user by using an encoding template. Therefore, the system 700 further includes:

a decoding template generation apparatus 730, used for generating the decoding template according to the encoding template.

Further, in this implementation manner, the decoding template generation apparatus obtains the decoding template by converting the encoding template. Herein, the converting is reversal processing or reversal processing with compensation; for the further conversion method, refer to corresponding descriptions in the process embodiment above.

In this implementation manner, the system 700 further includes:

an encoding template generation apparatus 740, used for generating the encoding template according to a first pseudo-random sequence.

In order to determine a certain region in the view of the user to be an encoded pattern more quickly and accurately, in this implementation manner, the system 700 may further include:

a positioning identifier setting apparatus 750, used for setting a positioning identifier marking a region where the encoded pattern is located.

The positioning identifier is generally one pattern or a group of specific patterns, and therefore can be identified more easily than the encoded pattern; therefore, determining the region where the encoded pattern is located according to the positioning identifier is quicker and more accurate.

The positioning identifier setting apparatus 750 is usually set at an information providing end, and corresponding to the positioning identifier setting apparatus 750, the system 700, at a user end, further includes:

a positioning identifier identification apparatus 7100, used for identifying the positioning identifier; and the pattern recovery apparatus 720 is further used for determining the encoded pattern according to the identified positioning identifier, and overlaying the decoding template onto the determined encoded pattern.

In this implementation manner, the pattern recovery apparatus 720 includes:

an information projection module 721, used for projecting the decoding template to the at least one eye fundus of the user.

Herein, when the information projection module 721 is used to present the decoding template, for a specific method of acquiring the encoding template and the decoding template, refer to the method correspondingly used when the decoding template is presented in a manner of information projection in the above process embodiment, which is not repeated herein.

In one possible implementation manner, the information projection module 721 includes:

a projection sub-module 7211, used for projecting the decoding module; and a parameter adjustment sub-module 7212, used for adjusting at least one projection imaging parameter of an optical path between the projection position and eyes of the user, until the authentication prompt information and an image of the object are correspondingly clearly imaged in the at least one eye fundus of the user.

A detailed structure of the information projection module 721 will be given in the following embodiment of smart glasses, which is not repeated herein.

It is likely that the pattern encoding apparatus 710, the decoding template generation apparatus 730, the encoding template generation apparatus 740, and the positioning identifier setting apparatus 750 are all located at the information providing end, and in one possibility, the functions of the apparatuses may be implemented by an information providing system. Definitely, in one possible implementation manner, the decoding template generation apparatus 730 may also be located at the user end.

In the embodiment of the present application, for the functions of the apparatuses and devices, refer to corresponding descriptions in the above process embodiment.

As shown in FIG. 8b, in another possible implementation manner of the embodiment of the present application, the system obtains an encoding template corresponding to a specific user by using a decoding template of the user, and encodes to be provided for the specific user by using the encoding template. Therefore, the system 700 further includes:

an encoding template generation apparatus 760, used for generating the encoding template according to the decoding template.

In this implementation manner, the encoding template generation apparatus 760 is further used for converting the decoding template to obtain the encoding template. The converting is reversal processing or reversal processing with compensation.

In this implementation manner, the system 700 may further include:

a decoding template generating apparatus 770, used for generating the decoding template according to a second pseudo-random sequence.

In this implementation manner, the pattern recovery apparatus 720 may include:

an information display module 722, used for displaying the decoding template on an optical path between eyes of the user and the encoded pattern; and a pattern enhancement module 723, used for obtaining at least one enhancement template according to the recovery pattern, and overlaying the at least one enhancement template to the recovery pattern, to obtain an enhanced recovery pattern presented in the at least one eye fundus of the user.

When the embodiment of the present application uses the information display module 722 to present the decoding template, it is implemented by corresponding encoding and decoding templates when the decoding template is presented in a manner of inserting the decoding template in the optical path between the eyes and the recovery pattern in the above process embodiment.

In the embodiment of the present invention, for the functions of the apparatuses and modules, refer to corresponding descriptions in the above process embodiment.

In the embodiment of the present application, the function of the pattern recovery apparatus 720 may be implemented by using a wearable device around the eyes.

As shown in FIG. 8a, in the embodiment of the present application, an image in the at least one eye fundus of the user or an image of an object in the view of the user may be obtained by using an image acquisition apparatus, and then the image is analyzed in an image processing (including the identification of the encoded pattern or identification of the positioning identifier) manner, to obtain the position of the encoded pattern on the image (obtaining the position of an object on an image by image acquisition and image processing may be solved according to existing structures and technologies in the prior art, which is not repeated herein), and the decoding template is projected to a position corresponding to the position on the image. However, in order to make a better effect of overlaying of the decoding template and the encoded pattern, in the system according to the embodiment of the present application, it is necessary to first determine the position of the encoded pattern relative to the user by using an encoded pattern position determining apparatus 780, and then present the decoding template according to the position of the encoded pattern relative to the user by using the pattern recovery apparatus 720.

In one possible implementation manner, a position detection module 781 is used to determine the position of the encoded pattern relative to the user by detecting a sight fixation point of the user.

Herein, there may be many implementation manners of the position detection module 781, for example, apparatuses corresponding to the methods i)-iii) in the method embodiment. Apparatuses corresponding to the methods i) and ii) are prior arts, which are not repeated herein. The embodiment of the present application further describes the position detection module corresponding to the method iii) in implementation manners in FIG. 9a to FIG. 9c.

Figure 9A:
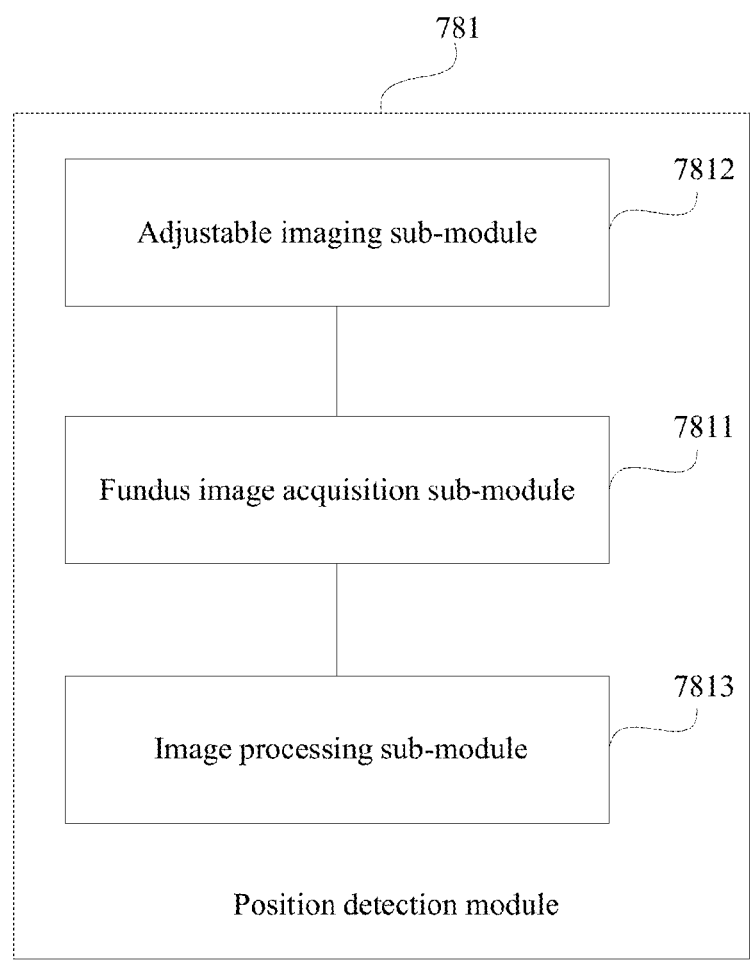
FIG. 9a is an example schematic structural block diagram of a position detection module of a pattern recovery apparatus according to an embodiment of the present application.

As shown in FIG. 9a, in one possible implementation manner of the embodiment of the present application, the position detection module 781 includes:

a fundus image acquisition sub-module 7811, used for acquiring an image in the at least one eye fundus of the user; in some embodiments, the fundus image acquisition sub-module 7811 may be a miniature camera or other photographic imaging devices, for example, CCD, CMOS or like.

An adjustable imaging sub-module 7812 is used for performing adjustment on at least one imaging parameter of an optical path between the fundus image acquisition position and the eyes of the user until an image whose definition is in a set threshold range is acquired; in the embodiment of the present application, the adjustable imaging sub-module 7812 may include the focal length or the lens group in the above method embodiment. In addition, the adjustable imaging sub-module 7812 may further include a light splitting unit, used for forming a light transmission path between eyes and an observation object as well as between the eyes and the fundus image acquisition sub-module 7811. In this way, the optical path can be folded, to reduce the volume of the system, and other visual experience of the user may not be affected as much as possible.

An image processing sub-module 7813 is used for analyzing the acquired image in the at least one eye fundus, to obtain the imaging parameter of the optical path between the fundus image acquisition position and the eyes corresponding to the image whose definition is in the set threshold range and at least one optical parameter of the eyes, and calculating the position of a current fixation point of the user relative to the user. Herein, similar to the description in the above method embodiment, the optical parameter of the eyes includes an eye optical axis direction.

The position detection module 781 analyses an image in the at least one eye fundus of the eyes, to obtain the optical parameter of the eyes when the fundus image acquisition sub-module obtains the image, and can obtain the position of the current fixation point of the eyes through calculation in combination with the known imaging parameter of the system.

In this implementation manner, the known imaging parameter of the system includes a fixed imaging parameter and a real-time imaging parameter, where the real-time imaging parameter is parameter information of the adjustable lens device when the image whose definition is in the set range is acquired, and the parameter information may be obtained by real-time recording when the image is acquired.

A distance from an eye fixation point to the eyes is calculated below, which is specifically as follows.

Figure 9B:
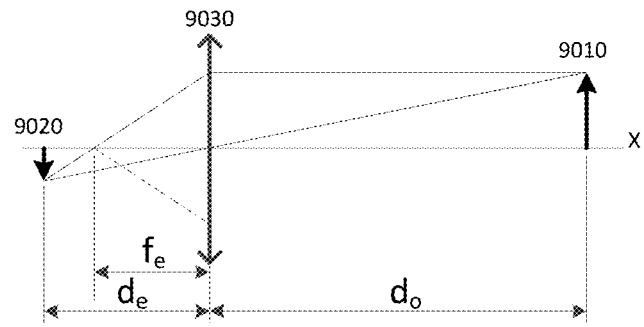
FIG. 9b and FIG. 9c are example schematic diagrams of an optical path used in the position detection module according to an embodiment of the present application.

FIG. 9b is a schematic diagram of eye imaging, and in combination with a lens imaging formula in a classical optical theory, a formula (91) may be obtained according to FIG. 9b:

$$\frac{1}{d_o} + \frac{1}{d_e} = \frac{1}{f_e} \qquad (91)$$

where $d_o$ and $d_e$ are respectively distances from a current observation object 9010 of the eyes and a real image 9020 on the retina to an eye equivalent lens 9030, $f_e$ is an equivalent focal length of the eye equivalent lens 9030, and X is a sight direction of the eyes (which may be obtained from the optical axis direction of the eyes).

Figure 9C:
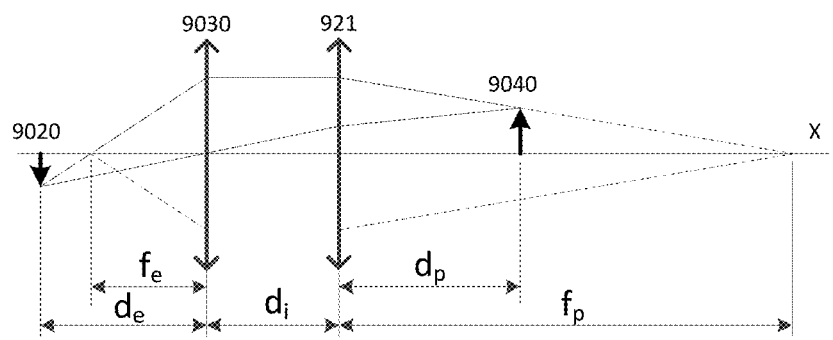

FIG. 9c is a schematic diagram of a distance from an eye fixation point to the eyes obtained according to a known optical parameter of the system and an optical parameter of the eyes, in FIG. 9c, a light spot 9040 may form a virtual image (not shown in FIG. 9c) by using an adjustable lens device 921, and suppose that a distance from the virtual image to the lens is x (not shown in FIG. 9c), the following equation system may be obtained in combination with the formula (91):

$$\begin{cases} \dfrac{1}{d_p} - \dfrac{1}{x} = \dfrac{1}{f_p} \\ \dfrac{1}{d_i + x} + \dfrac{1}{d_e} = \dfrac{1}{f_e} \end{cases} \qquad (92)$$

where $d_p$ is an optical equivalent distance from the light spot 9040 to the adjustable lens device 921, $d_i$ is an optical equivalent distance from the adjustable lens device 921 to the eye equivalent lens 9030, and $f_p$ is a focal length value of the adjustable lens device 921.

It can be obtained from (91) and (92) that the distance $d_o$ from the current observation object 9010 (eye fixation point) to the eye equivalent lens 9030 is as shown in a formula (93):

$$d_o = d_i + \frac{d_p \cdot f_p}{f_p - d_p} \qquad (93)$$

According to the distance from the observation object 9010 to the eyes obtained through calculation, the position of the eye fixation point can be obtained easily as the optical axis direction of the eyes can be obtained due to the previous description. In the embodiment of the present application, as the user is viewing the encoded pattern, the fixation point of the user is on the encoded pattern, and then the position of the encoded pattern relative to the user can be obtained according to characteristics of the encoded pattern (for example, the positioning identifier).

In order that the method according to the embodiment of the present application can quickly and accurately determine a position of the decoding template to be presented according to the position of the encoded pattern, in one possible implementation manner, as shown in FIG. 8b, the system 700 may further include:

a calibration apparatus 790, establishing a corresponding relationship between a presentation parameter (including presentation position, size, angle and the like) of the decoding template and the position of the encoded pattern through calibration. The corresponding relationship may be indicated by a mapping table between the presentation parameter of the decoding template and the position of the encoded pattern is established.

The calibration apparatus 790 may include a storage module 791, used for storing the mapping table of the corresponding relationship.

In this way, when the position of the encoded pattern is obtained, position, size and other parameters of the decoding template to be presented can be quickly and accurately obtained according to the mapping table, which does not require other calculation or calibration.

To sum up, by using the system according to the embodiment of the present application, the user can directly see a recovery pattern constituted by overlaying a decoding template and an encoded pattern, and obtain information provided for the user by an information providing end.

Figure 10:
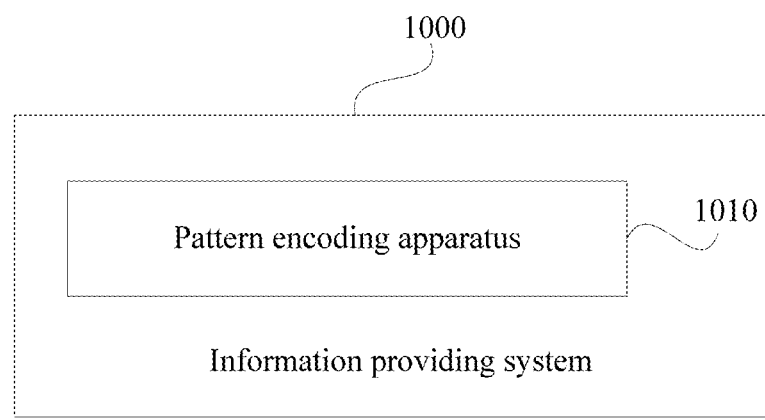
FIG. 10, FIG. 11a, and FIG. 11b are example schematic structural block diagrams of three information providing systems according to an embodiment of the present application.

As shown in FIG. 10, an embodiment of the present application further provides an information providing system 1000, including:

a pattern encoding apparatus 1010, used for overlaying at least one encoding template with at least one original pattern, to obtain an encoded pattern.

The following uses that an encoding template and an original pattern are overlaid to obtain the encoded pattern as an example for description.

Figure 11A:
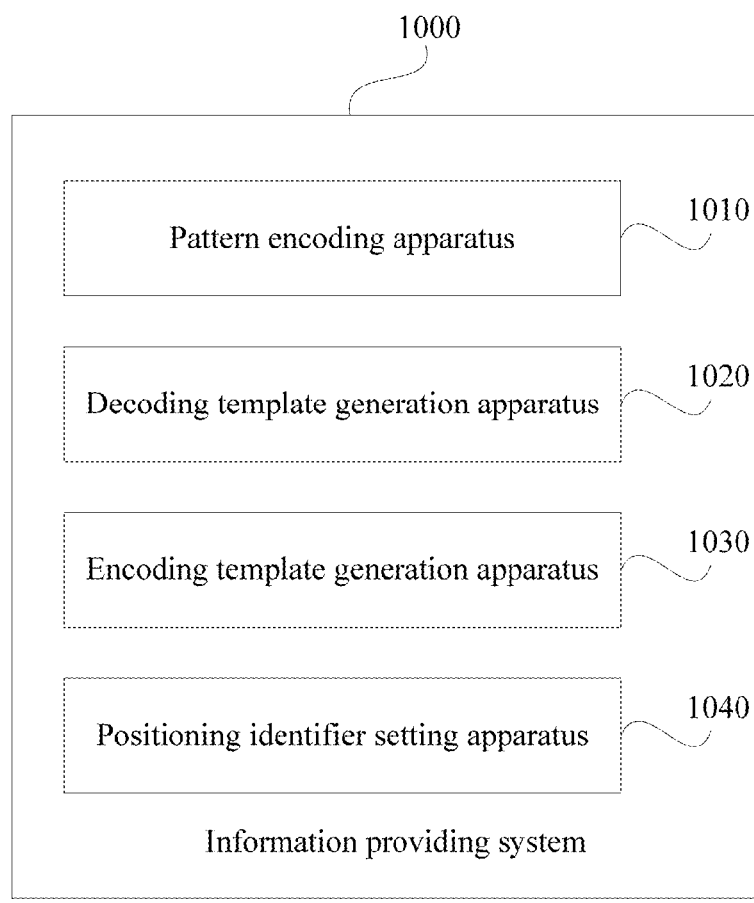

As shown in FIG. 11a, in one possible implementation manner, the system 1000 further includes:

a decoding template generation apparatus 1020, used for generating a decoding template corresponding to the encoding template;

in this implementation manner, the decoding template generation apparatus 1020 obtains the decoding template by converting the encoding template. The converting is reversal processing or reversal processing with compensation;

a encoding template generation apparatus 1030, used for generating the encoding template from a first pseudo-random sequence; and a positioning identifier setting apparatus 1040, used for setting a positioning identifier marking a region where the encoded pattern is located.

For specific structures and functions of the apparatuses, refer to corresponding descriptions in the above embodiment.

Figure 11B:
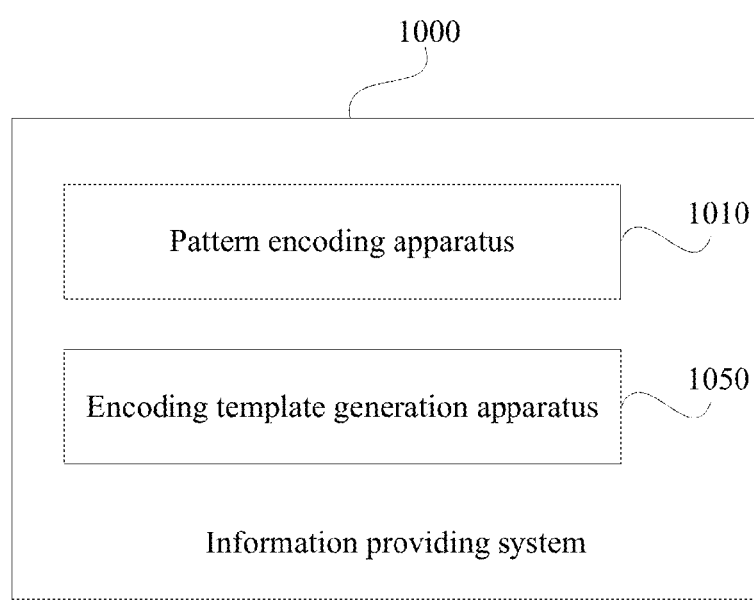

As shown in FIG. 11b, in one possible implementation manner, the system 1000 further includes:

an encoding template generation apparatus 1050, used for generating the encoding template according to a decoding template.

The encoding template generation apparatus 1050 obtains the encoding template by converting the decoding template. The converting is reversal processing or reversal processing with compensation.

The decoding template is a decoding template corresponding to a specific user, which may be obtained from a user end, or may also be obtained from a third party.

Figure 11C:
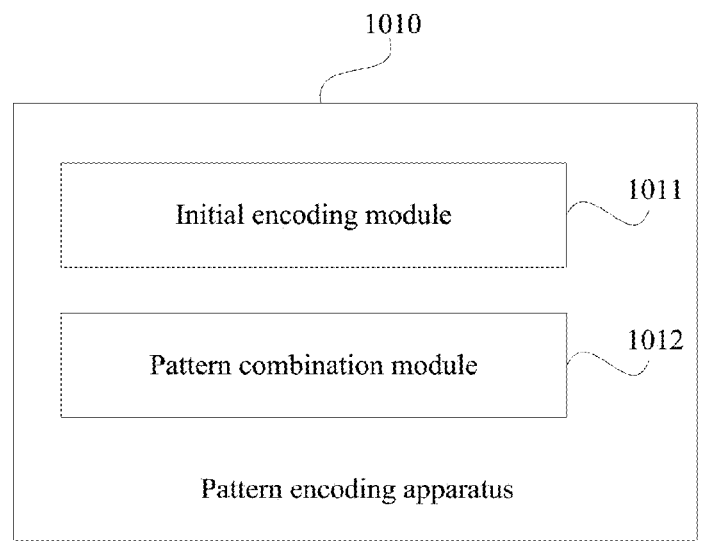
FIG. 11c is an example schematic structural block diagram of a pattern encoding apparatus according to an embodiment of the present application.

As shown in FIG. 11c, in another possible implementation manner, the encoded pattern corresponds to a plurality of original patterns, the at least one encoding template is multiple groups of encoding templates whose mutual interference values are in a set range, where each group of encoding templates in the multiple groups of encoding templates include at least one sub-encoding template.

The pattern encoding apparatus 1010 includes:

an initial encoding module 1011, used for overlaying the multiple groups of encoding templates to the plurality of original patterns in a one-to-one corresponding manner, to obtain a plurality of initial encoded patterns; and a pattern combination module 1012, used for synthesizing the plurality of initial encoded patterns into an encoded pattern.

For specific structures and functions of the apparatuses, refer to corresponding descriptions in the above embodiment.

The information providing system, for example, may be a server, which securely provides information for the specific user by means of the encoded pattern.

Alternatively, the information providing system may also be a first user equipment (UE) (for example, a computer, a cell phone or other electronic devices), which securely provides information for at least one second UE through the encoded pattern.

According to the encoded pattern obtained through encoding according to the pattern encoding apparatus of the implementation manner, decoding of the encoded pattern can be completed through overlaying of a decoding template corresponding to the encoding template and the encoded pattern, which provides a basis for convenient and secure decoding of the user end.

Figure 12:
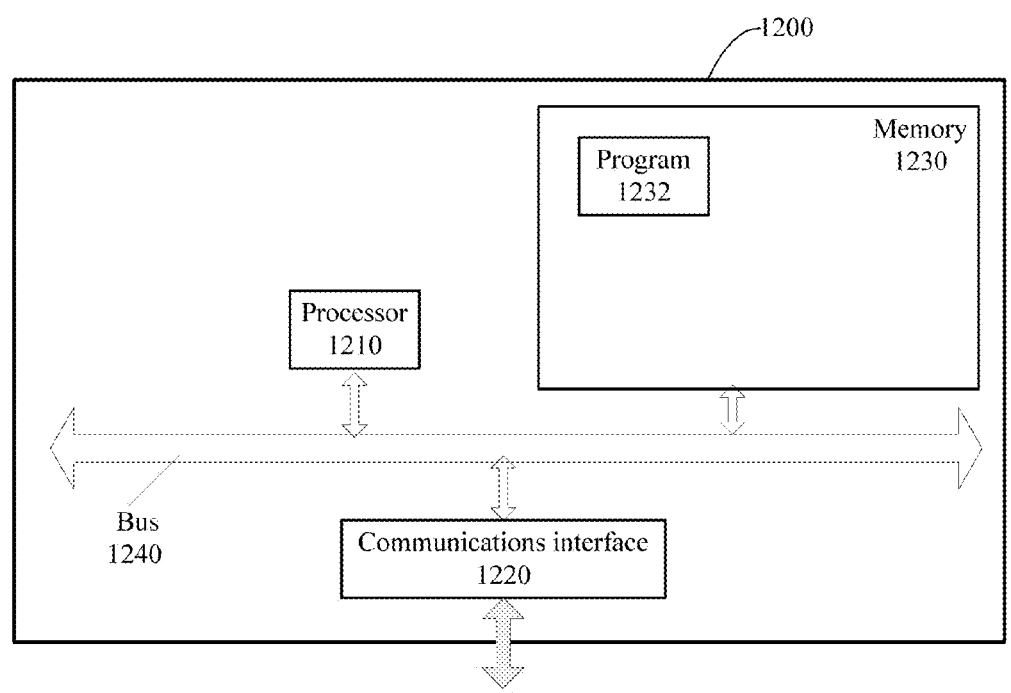
FIG. 12 is an example schematic structural block diagram of an information providing system according to an embodiment of the present application.

FIG. 12 is a schematic structural block diagram of another information providing system 1200 according to an embodiment of the present application, and the specific embodiment of the present application does not limit specific implementation of the information providing system 1200. As shown in FIG. 12, the information providing system 1200 may include:

a processor 1210, a communications interface 1220, a memory 1230, and a communications bus 1240.

The processor 1210, the communications interface 1220, and the memory 1230 complete communications therebetween by means of the communications bus 1240.

The communications interface 1220 is used for communicating with network elements of, for example, a client or the like.

The processor 1210 is used for executing a program 1232, and may specifically execute related steps in the above method embodiment.

Specifically, the program 1232 may include a program code, and the program code includes a computer operating instruction.

The processor 1210 may be a CPU, or an Application Specific Integrated Circuit (ASIC), or may be configured as one or more ICs implementing the embodiment of the present application.

The memory 1230 is used for storing the program 1232. The memory 1230 may include a high-speed RAM memory, or may further include a non-volatile memory, for example, at least one magnetic disk memory. The program 1232 may be specifically used for making the information providing system 1200 execute the following step:

a pattern encoding step of overlaying at least one encoding template with at least one original pattern, to obtain an encoded pattern.

For specific implementation of the steps of the program 1232, reference may be made to corresponding descriptions in the corresponding steps and units in the above embodiments, which is not repeated therein. Persons skilled in the art may clearly understand that, for convenience and conciseness of description, for the specific operation process of the devices and modules described above, reference may be made to corresponding process descriptions in the foregoing process embodiments, which is not repeated herein.

Figure 13:
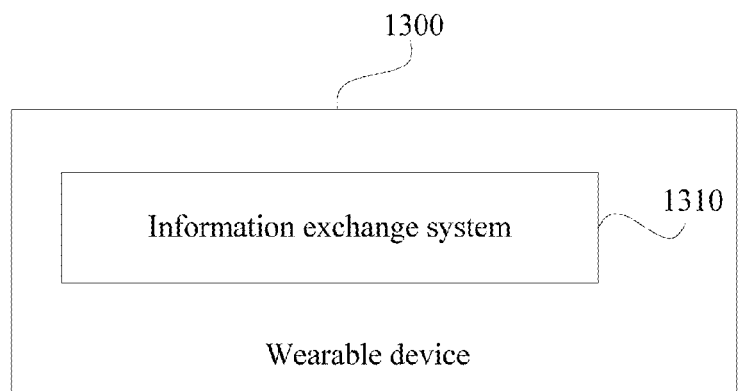
FIG. 13 an example schematic structural block diagram of a wearable device according to an embodiment of the present application.

As shown in FIG. 13, an embodiment of the present application further provides a wearable device 1300, including the information exchange system 1310 described above.

In one possible implementation manner, the wearable device is smart glasses. Definitely, in other possible implementation manners of the embodiment of the present application, the wearable device may also be a wearable device worn around the glasses for use, such as a helmet device or an eyepiece device.

The smart glasses according to the embodiment of the present application are further described below according to the embodiment shown in FIG. 14.

In the embodiment of the present application, the smart glasses 1600 include the information exchange system described in the FIG. 6. The pattern recovery apparatus of the information providing system includes an information projection module, and the encoded pattern position determining apparatus includes a position detection module. In the embodiment of the present application, structures of the information projection module and the position detection module are multiplexed.

Figure 14:
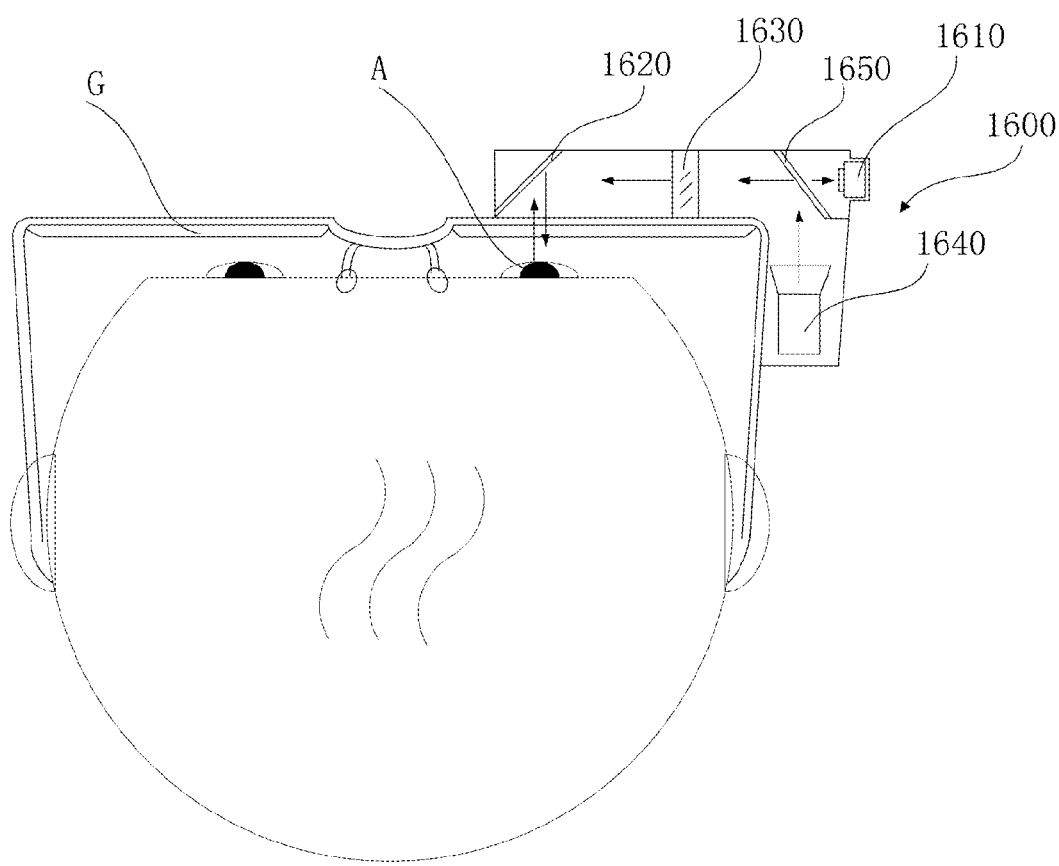
FIG. 14 is an example schematic structural diagram of smart glasses according to an embodiment of the present application.

It can be seen from FIG. 14 that, in this implementation manner, the information providing system of this implementation manner is integrated on the right side of the glasses body G (not limited to this), which includes:

a miniature camera 1610, used for shooting an image in an eye fundus of a user, which may be used as the fundus image acquisition sub-module of the position detection module, and in order not to affect the user's normal sight of viewing the object, it is set on the right outer side of the glasses body G;

a first light splitter 1620, disposed at an intersection between a gaze direction of an eye A and an incident direction of the camera 1610 at a certain tilt angle, and transmitting light of an observation object entering the eye A and reflecting light from the eye to the camera 1610; and a variable focal length lens 1630, located between the first light splitter 1620 and the camera 1610, real-time adjusting a focal length value, which may function as the adjustable imaging sub-module of the position detection module and the parameter adjustment sub-module of the information projection module, so that, in the case of a certain focal length value, the camera 1610 can shoot an image whose fundus definition is in a set range, and the decoding template projected by the information projection module is presented in a position corresponding to the at least one eye fundus of the user.

In this implementation manner, the image processing sub-module of the position detection module is not shown in FIG. 14.

A mini projector 1640 functions as the projection sub-module of the information projection module, and projects a corresponding decoding pattern to the fundus of the user; in addition, the micro projector 1640 may also provide lighting for the position detection module or project a reference pattern. In order not to affect user experience, while playing the role of lighting or projecting a reference pattern, light projected by the mini projector 1640 may be light invisible to the eyes, for example, may be infrared light.

In this implementation manner, the mini projector 1640 is located outside the glasses frame on the right side, and therefore transfer of light emitted from the mini projector 1640 from the light to the fundus needs to be completed with the first light splitter 1620 by using a second light splitter 1650. In this implementation manner, the second light splitter 1650 is located before an incident surface of the camera 1610, and therefore it further needs to transmit light from the fundus to the second light splitter 1650.

It can be seen from FIG. 14 that, in this implementation manner, the position detection module 1600 is located on one side where a lens of the glasses body G is away from the eye A, therefore, when the optical parameter of the eye is calculated, the lens may also be seen as part of the eye A, and in this case, it is unnecessary to know optical characteristics of the lens.

In other implementation manners of the embodiment of the present application, the position detection module 1600 may be located on one side where a lens of the glasses body G is close to the eye A, and in this case, it is necessary to previously obtain an optical characteristic parameter of the lens, and influencing factors of the lens should be considered when a fixation point distance is calculated.

Content projected by the mini projector 1640 in this embodiment enters the user's eyes through reflection of the second light splitter 1650, transmission of the variable focal length lens 1630 and reflection of the first light splitter 1620 and then through the lens of the glasses body G, and finally reaches the retina of the fundus; the camera 1610 shoots an image in the fundus through a pupil of the eye A by passing through an optical path constituted by the first light splitter 1620, the variable focal length lens 1630, and the second light splitter 1650.

It can be seen from the above that, the functions of the position detection module and the information projection module of the information providing system according to the embodiment of the present application may be implemented by a set of equipment, so that the whole system has a simple structure, small volume, and is more portable.

In other possible implementation manners of the embodiment of the present application, the information projection module may perform projection for two eyes of the user, and in this case, it is also necessary to set a corresponding projector, a variable focal length lens and a light splitter on the other side of the glasses body G.

In the embodiment of the present application, other apparatuses of the information exchange system are not shown, and functions of the other apparatus may be implemented by a processing module installed on or embedded into the glasses body G.

Persons of ordinary skill in the art may realize that, in combination with the units and method steps in the examples described in the embodiments disclosed herein, the functions can be implemented with electronic hardware, or a combination of computer software and electronic hardware. Whether the functions are executed by means of hardware or software depends on specific applications of the technical solution and design constraints. Professional technicians may implement the functions described with different methods for each specific application, but such implementation should be not considered as beyond the scope of the present application.

If the functions are implemented in a form of software functional units and are sold or used as separate products, they can be stored in a computer readable storage medium. Based on such comprehension, the technical solution of the present application or the part that makes contributions to the prior art or part of the technical solution can be substantially embodied in the form of a software product, the computer software product is stored in a storage medium, and contain several instructions to instruct a computer device (for example, a personal computer, a server, or a network device) to perform all or part of the steps of the method as described in the embodiments of the present application. The storage medium includes various media that can store program codes, such as a U disk, a mobile hard disk, a read-only memory (ROM), a random access memory (RAM), a magnetic disk or an optical disc.

The above embodiments are merely for describing the present application, but are not intended to limit the present application, and persons of ordinary skill in the art may make various variations and modifications without departing from the spirit and scope of the present application; therefore, all equivalent technical solutions fall with the scope of the present application, and the patent protection scope of the present application shall be defined by the claims.

The invention claimed is:

1. A method, comprising:
overlaying, by a system comprising a processor, at least one decoding template onto an encoded pattern in at least one eye fundus of a user, to obtain a recovery pattern presented in the at least one eye fundus of the user, wherein the recovery pattern corresponds to at least one original pattern of the encoded pattern, and the at least one decoding template corresponds to at least one encoder forming the encoded pattern, the at least one decoding template comprises at least one decoding pattern,
wherein the overlaying the at least one decoding template onto the encoded pattern in the least one eye fundus of the user comprises:
projecting the at least one decoding template to the at least one eye fundus of the user.

2. The method of claim 1, wherein the at least one decoding template is a plurality of decoding templates, and wherein the overlaying the at least one decoding template onto the encoded pattern in the at least one eye fundus of the user further comprises:
displaying other decoding templates in the plurality of decoding templates on an optical path between at least one eye corresponding to the at least one eye fundus of the user and the encoded pattern.

3. The method of claim 1, further comprising:
obtaining at least one enhancement template according to the recovery pattern, and overlaying the at least one enhancement template to the recovery pattern, to obtain an enhanced recovery pattern presented in the at least one eye fundus of the user.

4. The method of claim 1, further comprising:
encoding the at least one original pattern by using the at least one encoder, to obtain the encoded pattern.

5. The method of claim 4, wherein the at least one encoder is at least one encoding template, and
wherein the encoding the at least one original pattern by using the at least one encoder, to obtain the encoded pattern comprises:
overlaying the at least one encoding template with the at least one original pattern, to obtain the encoded pattern.

6. The method of claim 4, wherein:
the at least one original pattern is a plurality of original patterns;
wherein the at least one encoder is multiple groups of encoders comprising mutual interference values that are in a set range; and
wherein the encoding the at least one original pattern by using the at least one encoder, to obtain the encoded pattern comprises:
encoding the plurality of original patterns by using the multiple groups of encoders in a one-to-one corresponding manner, to obtain a plurality of initial encoded patterns, wherein each group of encoders in the multiple groups of encoders comprise at least one sub-encoder; and
synthesizing the plurality of initial encoded patterns into the encoded pattern.

7. The method of claim 6, wherein:
the multiple groups of encoders are multiple groups of encoding templates, wherein each group of encoding templates in the multiple groups of encoding templates comprise at least one sub-encoding template; and
wherein the encoding the plurality of original patterns by using the multiple groups of encoders in the one-to-one corresponding manner, to obtain the plurality of initial encoded patterns comprises:
overlaying the multiple groups of encoding templates to the plurality of original patterns in the one-to-one corresponding manner, to obtain the plurality of initial encoded patterns.

8. The method of claim 7, wherein each group of encoding templates in the multiple groups of encoding templates are orthogonal to other groups of encoding templates in the multiple groups of encoding templates.

9. A method, comprising:
overlaying, by a system comprising a processor, at least one encoding template with at least one original pattern, to obtain an encoded pattern,
wherein:
the at least one original pattern comprises a plurality of original patterns;
the at least one encoding template comprises multiple groups of encoding templates whose mutual interference values are in a set range;

each group of encoding templates in the multiple groups of encoding templates comprises at least one sub-encoding template; and
the overlaying of the at least one encoding template with the at least one original pattern, to obtain the encoded pattern comprises:
overlaying the multiple groups of encoding templates to the plurality of original patterns in a one-to-one corresponding manner, to obtain a plurality of initial encoded patterns; and
synthesizing the plurality of initial encoded patterns into the encoded pattern, such that a recovery pattern corresponding to one original pattern in the plurality of original patterns is obtained by overlaying at least one decoding pattern onto the encoded pattern in the at least one eye fundus of the user, where the at least one decoding pattern corresponds to at least one group of encoders in the multiple groups of encoders.

10. The method of claim 9, wherein:
each group of encoding templates in the multiple groups of encoding templates are orthogonal to other groups of encoding templates in the multiple groups of encoding templates.

11. The method of claim 9, wherein the at least one encoding template is at least one encoding pattern.

12. A system, comprising:
a pattern recovery apparatus configured to overlay at least one decoding template onto an encoded pattern in at least one eye fundus of a user, to obtain a recovery pattern presented in the at least one eye fundus of the user, wherein the recovery pattern corresponds to at least one original pattern of the encoded pattern, and the at least one decoding template corresponds to at least one encoder forming the encoded pattern, the at least one decoding template comprises at least one decoding pattern,
wherein the pattern recovery apparatus comprises:
an information projection module configured to project the at least one decoding template to the at least one eye fundus of the user.

13. The system of claim 12, wherein the at least one decoding template is a plurality of decoding templates, and wherein the pattern recovery apparatus further comprises:
an information display module configured to display, on an optical path between at least one eye corresponding to the at least one eye fundus of the user and the encoded pattern, other decoding templates in the plurality of decoding templates.

14. The system of claim 12, further comprising:
a pattern encoding apparatus configured to encode the at least one original pattern by using the at least one encoder, to obtain the encoded pattern.

15. The system of claim 14, wherein the at least one encoder is at least one encoding template, and
the pattern encoding apparatus is further configured to:
overlay the at least one encoding template with the at least one original pattern, to obtain the encoded pattern.

16. The system of claim 14, wherein:
the at least one original pattern is a plurality of original patterns;
the at least one encoder is multiple groups of encoders whose mutual interference values are in a set range; and
the pattern encoding apparatus comprises:
an initial encoding module configured to encode the plurality of original patterns by using the multiple groups of encoders in a one-to-one corresponding manner, to obtain a plurality of initial encoded patterns, wherein each group of encoders in the multiple groups of encoders comprise at least one sub-encoder; and a pattern combination module configured to synthesize the plurality of initial encoded patterns into the encoded pattern.

17. The system of claim 16, wherein:

the multiple groups of encoders are multiple groups of encoding templates, each group of encoding templates in the multiple groups of encoding templates comprise at least one sub-encoding template, and the initial encoding module is further configured to overlay the multiple groups of encoding templates to the plurality of original patterns in a one-to-one corresponding manner, to obtain the plurality of initial encoded patterns.

18. A system, comprising:

a pattern encoding apparatus configured to overlay at least one encoding template with at least one original pattern, to obtain the encoded pattern, wherein the at least one original pattern comprises a plurality of original patterns;

the at least one encoding template comprises multiple groups of encoding templates whose mutual interference values are in a set range;

each group of encoding templates in the multiple groups of encoding templates comprises at least one sub-encoding template; and the pattern encoding apparatus comprises:

an initial encoding module configured to overlay the multiple groups of encoding templates to the plurality of original patterns in a one-to-one corresponding manner, to obtain a plurality of initial encoded patterns; and a pattern combination module configured to synthesize the plurality of initial encoded patterns into the encoded pattern, such that a recovery pattern corresponding to one original pattern in the plurality of original patterns is obtained by overlaying at least one decoding pattern onto the encoded pattern in the at least one eye fundus of the user, where the at least one decoding pattern corresponds to at least one group of encoders in the multiple groups of encoders.

19. The system of claim 18, wherein:

each group of encoding templates in the multiple groups of encoding templates are orthogonal to other groups of encoding templates in the multiple groups of encoding templates.

20. A non-transitory computer readable storage apparatus, comprising at least one executable instruction, which, in response to execution, causes a system comprising a processor to perform operations, comprising:

overlaying at least one decoding template onto an encoded pattern in at least one eye fundus of a user, to obtain a recovery pattern presented in the at least one eye fundus of the user, wherein the recovery pattern corresponds to at least one original pattern of the encoded pattern, and the at least one decoding template corresponds to at least one encoder forming the encoded pattern, the at least one decoding template comprises at least one decoding pattern, wherein the overlaying the at least one decoding template onto the encoded pattern in the least one eye fundus of the user comprises:

projecting the at least one decoding template to the at least one eye fundus of the user.

21. An information exchange system, comprising a processing device and a memory, wherein the memory stores at least one executable instruction, the processing device is communicatively coupled to the memory, and when the information exchange system operates, the processing device executes the at least one executable instruction stored by the memory, to cause the information exchange system to perform at least one operation, comprising:

overlaying at least one decoding template onto an encoded pattern in at least one eye fundus of a user, to obtain a recovery pattern presented in the at least one eye fundus of the user, wherein the recovery pattern corresponds to at least one original pattern of the encoded pattern, and the at least one decoding template corresponds to at least one encoder forming the encoded pattern, the at least one decoding template comprises at least one decoding pattern, wherein the overlaying the at least one decoding template onto the encoded pattern in the least one eye fundus of the user comprises:

projecting the at least one decoding template to the at least one eye fundus of the user.

22. A non-transitory computer readable storage apparatus, comprising an executable instruction, wherein corresponding to execution of the executable instruction, an apparatus comprising a processor performs an operation, comprising:

overlaying at least one encoding template with at least one original pattern, to obtain an encoded pattern, wherein the at least one original pattern comprises a plurality of original patterns;

the at least one encoding template comprises multiple groups of encoding templates whose mutual interference values are in a set range;

each group of encoding templates in the multiple groups of encoding templates comprises at least one sub-encoding template; and the overlaying of the at least one encoding template with the at least one original pattern, to obtain the encoded pattern comprises:

overlaying the multiple groups of encoding templates to the plurality of original patterns in a one-to-one corresponding manner, to obtain a plurality of initial encoded patterns; and synthesizing the plurality of initial encoded patterns into the encoded pattern, such that a recovery pattern corresponding to one original pattern in the plurality of original patterns is obtained by overlaying at least one decoding pattern onto the encoded pattern in the at least one eye fundus of the user, where the at least one decoding pattern corresponds to at least one group of encoders in the multiple groups of encoders.

23. An information providing system, comprising a processing device and a memory, wherein the memory stores at least one executable instruction, the processing device is connected to the memory by means of a communications bus, and when the information providing system operates, the processing device executes the at least one executable instruction stored by the memory, to cause the information providing system to perform operations, comprising:

overlaying at least one encoding template with at least one original pattern, to obtain an encoded pattern, wherein the at least one original pattern comprises a plurality of original patterns;

the at least one encoding template comprises multiple groups of encoding templates whose mutual interference values are in a set range;

each group of encoding templates in the multiple groups of encoding templates comprises at least one sub-encoding template; and the overlaying of the at least one encoding template with the at least one original pattern, to obtain the encoded pattern comprises:

overlaying the multiple groups of encoding templates to the plurality of original patterns in a one-to-one corresponding manner, to obtain a plurality of initial encoded patterns; and synthesizing the plurality of initial encoded patterns into the encoded pattern, such that a recovery pattern corresponding to one original pattern in the plurality of original patterns is obtained by overlaying at least one decoding pattern onto the encoded pattern in the at least one eye fundus of the user, where the at least one decoding pattern corresponds to at least one group of encoders in the multiple groups of encoders.

* * * * *